(12) United States Patent
Imasaka et al.

(10) Patent No.: US 8,037,607 B2
(45) Date of Patent: Oct. 18, 2011

(54) PROCESS FOR PRODUCING CONDUCTIVE RUBBER ROLLER, AND ROLLER FOR ELECTROPHOTOGRAPHIC APPARATUS

(75) Inventors: Hiroshi Imasaka, Tokyo (JP); Satoshi Fukuzawa, Tsukuba-gun (JP); Mitsuru Okuda, Moriya (JP); Erika Umeki, Ushiku (JP)

(73) Assignee: Canon Kasei Kabushiki Kaisha, Tokyo (JP)

( * ) Notice: Subject to any disclaimer, the term of this patent is extended or adjusted under 35 U.S.C. 154(b) by 308 days.

(21) Appl. No.: 12/407,875

(22) Filed: Mar. 20, 2009

(65) Prior Publication Data

US 2009/0182065 A1    Jul. 16, 2009

Related U.S. Application Data

(60) Division of application No. 11/450,576, filed on Jun. 12, 2006, now Pat. No. 7,520,057, which is a continuation of application No. PCT/JP2006/302912, filed on Feb. 14, 2006.

(30) Foreign Application Priority Data

| Feb. 14, 2005 | (JP) | 2005-036079 |
| Feb. 14, 2005 | (JP) | 2005-036080 |
| Feb. 23, 2005 | (JP) | 2005-047222 |
| Feb. 24, 2005 | (JP) | 2005-049003 |
| Feb. 28, 2005 | (JP) | 2005-053816 |
| Feb. 3, 2006 | (JP) | 2006-027022 |

(51) Int. Cl.
*B21K 1/02* (2006.01)
*F16C 13/00* (2006.01)

(52) U.S. Cl. ........ 29/895.32; 29/895.3; 29/895; 492/59; 492/48; 492/53; 492/56; 492/57

(58) Field of Classification Search .............. 29/895, 29/895.3, 895.32, 895.33; 492/18, 48, 53, 492/56, 57, 59; 264/209.6
See application file for complete search history.

(56) References Cited

U.S. PATENT DOCUMENTS

| 6,166,094 | A  | * | 12/2000 | Mauk et al. | 516/11 |
| 6,523,263 | B2 | * | 2/2003 | Jo et al. | 29/895.32 |
| 6,942,607 | B2 | * | 9/2005 | Jo et al. | 492/56 |
| 7,187,890 | B2 | * | 3/2007 | Nishida | 399/179 |
| 7,220,796 | B2 | * | 5/2007 | Mizumoto et al. | 524/495 |
| 7,226,282 | B2 | * | 6/2007 | Jo et al. | 425/4 R |

(Continued)

FOREIGN PATENT DOCUMENTS

CN    1394906    2/2003

(Continued)

*Primary Examiner* — Essama Omgba
(74) *Attorney, Agent, or Firm* — Fitzpatrick, Cella, Harper & Scinto

(57) ABSTRACT

A process for producing a conductive rubber roller having a conductive core material and a rubber layer provided thereon. The rubber layer contains at least acrylonitrile rubber, epichlorohydrin rubber and a blowing agent, and has a gas generation rate of from 2 ml/g·min to 4 ml/g·min at 170° C. to 230° C. The process has a vulcanizing and foaming step of vulcanizing and foaming the rubber layer by using a microwave vulcanizing furnace which provides hot air and irradiation with microwaves. A temperature of a heating atmosphere in the microwave vulcanizing furnace in the vulcanizing and foaming step is so controlled that a ratio of initial vulcanizing time T10 to initial foaming time Tp10, T10/Tp10, of the rubber layer is from 1 or more to less than 3 and the T10 is within 90 seconds.

2 Claims, 2 Drawing Sheets

U.S. PATENT DOCUMENTS

| | | | |
|---|---|---|---|
| 7,291,663 B2 * | 11/2007 | Hattori et al. | 524/168 |
| 7,520,057 B2 * | 4/2009 | Imasaka et al. | 29/895.32 |
| 7,641,973 B2 * | 1/2010 | Hattori et al. | 428/421 |
| 7,897,076 B2 * | 3/2011 | Ji | 264/51 |
| 7,932,318 B2 * | 4/2011 | Hattori et al. | 524/556 |
| 2001/0002382 A1 * | 5/2001 | Jo et al. | 492/56 |
| 2003/0060348 A1 * | 3/2003 | Jo et al. | 492/56 |
| 2003/0125177 A1 * | 7/2003 | Jo et al. | 492/56 |
| 2003/0236330 A1 * | 12/2003 | Hattori et al. | 524/155 |
| 2004/0105983 A1 * | 6/2004 | Hattori et al. | 428/421 |
| 2004/0106708 A1 * | 6/2004 | Mizumoto et al. | 524/242 |
| 2004/0228659 A1 * | 11/2004 | Nishida | 399/176 |
| 2006/0074162 A1 * | 4/2006 | Mizumoto et al. | 524/401 |
| 2006/0252620 A1 | 11/2006 | Urano et al. | 492/56 |
| 2006/0280928 A1 * | 12/2006 | Imasaka et al. | 428/304.4 |
| 2008/0056766 A1 * | 3/2008 | Furuya | 399/176 |
| 2008/0159791 A1 * | 7/2008 | Urano et al. | 399/313 |
| 2008/0281027 A1 * | 11/2008 | Hattori et al. | 524/424 |
| 2009/0011350 A1 * | 1/2009 | Ji | 430/96 |
| 2009/0162109 A1 * | 6/2009 | Koyama et al. | 399/286 |
| 2009/0182065 A1 * | 7/2009 | Imasaka et al. | 521/89 |
| 2010/0069208 A1 * | 3/2010 | Marui et al. | 492/59 |
| 2010/0222483 A1 * | 9/2010 | Hattori et al. | 524/424 |

FOREIGN PATENT DOCUMENTS

| | | | |
|---|---|---|---|
| JP | 02-098411 | | 4/1990 |
| JP | 6-344510 | | 12/1994 |
| JP | 10-171210 | | 6/1998 |
| JP | 10-309725 | | 11/1998 |
| JP | 11-114978 | | 4/1999 |
| JP | 11-201140 | | 7/1999 |
| JP | 2002-070835 | | 3/2002 |
| JP | 2002-221859 | | 8/2002 |
| JP | 2003233229 A | * | 8/2003 |
| JP | 2003-246485 | | 9/2003 |
| JP | 2003-247533 | | 9/2003 |
| JP | 2003270885 A | * | 9/2003 |
| JP | 2004045656 A | * | 2/2004 |
| JP | 2004069980 A | * | 3/2004 |
| JP | 2004322421 A | * | 11/2004 |
| JP | 2007279126 A | * | 10/2007 |

* cited by examiner

PROCESS FOR PRODUCING CONDUCTIVE RUBBER ROLLER, AND ROLLER FOR ELECTROPHOTOGRAPHIC APPARATUS

This application is a continuation of International Application No. PCT/JP2006/302912, filed Feb. 14, 2006, which claims the benefit of Japanese Patent Application No. 2005-036079 filed Feb. 14, 2005, Japanese Patent Application No. 2005-036080 filed Feb. 14, 2005, Japanese Patent Application No. 2005-047222 filed Feb. 23, 2005, Japanese Patent Application No. 2005-049003 filed Feb. 24, 2005, Japanese Patent Application No. 2005-053816 filed Feb. 28, 2005, and Japanese Patent Application No. 2006-027022 filed Feb. 3, 2006.

BACKGROUND OF THE INVENTION

1. Field of the Invention

This invention relates to a process for producing a conductive rubber roller used in image forming apparatus such as an electrophotographic copying apparatus, a printer and an electrostatic recording apparatus, and also to a roller for electrophotographic apparatus, such as a transfer roller, set in an image forming apparatus in which a transferable image composed of a toner image is formed and held on an image bearing member such as a photosensitive member by an imaging means such as an electrophotographic process or an electrostatic recording process, and transferred to a transfer medium such as paper.

2. Related Background Art

Conductive rubber rollers such as a charging roller, a transfer roller and a developing roller are used in many of image forming apparatus of an electrophotographic system, such as copying machines and printers. To provide these rollers with conductivity, a method is available in which a conductive filler such as carbon black is added, or in which a conductive rubber material such as acrylonitrile-butadiene rubber or epichlorohydrin rubber is compounded. These roller are each kept in contact with a photosensitive drum under application of a load, and also these rollers are electrified for a long time on account of their use. Accordingly, it is desirable for them to be made of a rubber material small in resistivity variation, and because of problems in production processes, rubber materials such as acrylonitrile-butadiene rubber and epichlorohydrin rubber are widely used in the transfer roller and the charging roller (see, e.g., Japanese Patent Applications Laid-open No. H10-171210 and No. 2002-070835).

The rubber material used for these rollers is kneaded together with a vulcanizing agent, a blowing agent, a filler and so forth so as to be made into a raw-material composition, which is then made into an unvulcanized, cylindrical rubber molded or extruded product by means of a mold, an extruder or the like, and thereafter this molded or extruded product is vulcanized and foamed by heating to make up a cylindrical foam. Thereafter, a core material is press-fitted to the cylindrical foam and then the peripheral surface of the foam is ground to have the shape of a roller. Such a method is used.

As methods for producing these conductive rubber rollers, the following are conventionally available: vulcanization by means of a vulcanizer using a high-pressure steam (see, e.g., Japanese Patent Application Laid-open No. H11-114978), mold vulcanization carried out using a cylindrical mold (see, e.g., Japanese Patent Application Laid-open No. H11-201140), and UHF vulcanization carried out by microwave irradiation (see, e.g., Japanese Patent Application Laid-open No. 2002-221859). In these methods, e.g., in the method of carrying out vulcanization by means of a vulcanizer, the cells in the roller foam obtained are so non-uniform that grinding must be carried out in a large quantity in order to expose the desired cells to the surface. In the molding vulcanization carried out using a cylindrical mold, it takes time to make preparations therefor, besides mold cleaning must be carried out. Hence, it has been unsuitable for producing rollers in a large number.

Firstly, although the method making use of UHF vulcanization can be easily prepared and provides uniform cells, the tube formed may collapse when the rubber is softened, resulting in non-uniform aspect ratios of tube inner and outer diameters. This non-uniformity of the tube has created the non-uniformity of hardness and electrical resistance in the peripheral direction. In order to eliminate this non-uniformity of the tube, a method is known in which short UHF units are connected so as to slope the output of microwave irradiation. However, this method requires a long and large apparatus and takes a long time to excessively irradiate the tube with microwaves, whereby the properties of the rubber materials, epichlorohydrin rubber and acrylonitrile-butadiene rubber, are changed, resulting the high volume resistivity of the rubber material. Hence, the above method has been unsuitable for the conductive rubber rollers used in copying machines, printers and the like, and also there has been no presentation for any technical development directed to small-diameter rollers whose properties such as resistivity are required to delicately adjusted. To this vulcanized rubber tube, a conductive core material coated at its preset position with a conductive adhesive is press-fitted, followed by heat treatment, where the rubber tube may partially come off because of non-uniformity of the adhesive, thereby resulting in non-uniform charging. Further, taking into account handling of an organic solvent contained in the adhesive and environmental problems, it is desired to combine the vulcanized rubber tube and the conductive core material together without using any adhesive. It is possible to fasten the vulcanized rubber tube to the conductive core material at a certain pressure, to thereby combine them together without using any adhesive. However, in conventional techniques, the dimensional stability of inner diameter is insufficient so that further improvement in precision has been sought for products. Because of such a background, in the production of conductive rubber rollers used in copying machines, printers and so forth, required to be free from the non-uniformity of hardness and electrical resistance in the peripheral direction, it is sought to provide a production process which is easily prepared for production steps and has good productivity.

Secondly, although the UHF vulcanization can be easily prepared and provides uniform cells, the rubber softens to come to have a larger area in contact with a conveyor and a roller when the rubber tube is heated in a furnace, thereby creating local non-uniformity in foaming. Especially where the rubber softens greatly, the rubber tube deforms to change in its inner diameter, resulting in a poor yield of the rubber tube to bring about an economical problem. Further, the foaming non-uniformity occurring in the rubber tube has been the cause of the non-uniformity of hardness and electrical resistance in the peripheral direction (see Japanese Patent Application Laid-open No. 2002-221859). Meanwhile, it is reported that a rubber tube having a double-layer structure is used and an inner-layer rubber composition is selectively vulcanized to retain the inner diameter of the tube (see Japanese Patent Application Laid-open No. 2003-246485). However, this has not remedied the foaming non-uniformity. In all the cases presented above, no sufficient analysis is made in regard to the foaming non-uniformity, and hence the methods are insufficient for producing a roller having uniform cells.

Thirdly, although the UHF vulcanization can be easily prepared and also provides uniform cells, the rubber softens to come to have a larger area in contact with a conveyor and a roller when the rubber tube is heated in a furnace, thereby creating local non-uniformity in foaming. Especially where the rubber softens greatly, the rubber tube deforms to change in its inner diameter, resulting in a poor yield of the rubber tube to bring about an economical problem. Further, the foaming non-uniformity occurring in the rubber tube has been the cause of the non-uniformity of hardness and electrical resistance in the peripheral direction (see Japanese Patent Application Laid-open No. 2002-221859). In all the cases presented as above, no sufficient analysis is made in regard to the foaming non-uniformity, and hence the methods are insufficient for producing a roller having uniform cells.

Where the above rubber material is heated with microwaves, the heating level for the rubber can be controlled by changing a coefficient of dielectric loss expressed by the product $\in r \cdot \tan \delta$ of dielectric constant ($\in r$) by dielectric power factor ($\tan \delta$). Taking note of this coefficient of dielectric loss, a method is reported in which the vulcanization is carried out in the state that conductive carbon black is added and compounded to a rubber component having a small coefficient of dielectric loss (see Japanese Patent Applications Laid-open No. H06-344510 and No. H10-309725). In this case, a technique is employed in which a coefficient of dielectric loss is made as large as 1.0 in order to heat a non-polar natural rubber. However, in a system containing a polar rubber as specified in the present invention, when a coefficient of dielectric loss is increased to be as large as 1.0, the rubber is overheated in some cases.

Fourthly, although the UHF vulcanization can be easily prepared and also provides uniform cells, the rubber softens to come to have a larger area in contact with a conveyor or a roller when the rubber tube is heated in a furnace. Especially in the initial stage of the vulcanization, the viscosity of the rubber decreases so greatly as to bring about such a problem that the rubber tube adheres to the conveyor and roller and, especially in the case of the roller, it winds around the roller. This has caused a lowering of the yield in the vulcanization step and a decrease in the operation rate, to bring about an economical problem. Further, the foaming non-uniformity may occur at the contact surface between the rubber tube and the conveyor or roller. This has been the cause of non-uniform hardness and electrical resistance in the peripheral direction. Also, in the cylindrical grinding for imparting a roller shape, the grinding is carried out in a large quantity in order not to leave non-uniformly ground portions, so that the rubber material must be discarded in a large quantity, bringing about an economical problem and an environmental problem as well (see, e.g., Japanese Patent Application Laid-open No. 2002-221859).

Fifthly, in order to provide these rubber rollers with conductivity, the following methods are conventionally available: a method in which a conductive filler such as carbon black is added and a method in which epichlorohydrin rubber is mixed in acrylonitrile-butadiene rubber to reduce the resistivity in virtue of the epichlorohydrin rubber. However, a problem is raised in that the mixing of epichlorohydrin rubber in a large quantity results in great variations in resistivity due to a change in environment such as temperature and humidity. Further, it is known that, if a mixture with a large quantity of epichlorohydrin rubber mixed therein is irradiated with microwaves, the backbone chain ether linkages are broken and the rubber may come to soften and deteriorate, resulting in unstable hardness of the roller. From such a background, in the production of conductive rubber rollers used in copying machines, printers and so forth, for which it is required that cells in the foamed rubber layer are uniform, there is no non-uniformity of hardness and electrical resistance in the peripheral direction, variations in resistivity in low-resistance ranges because of a change in environment such as temperature and humidity are small and the hardness is stable, it is sought to provide a production process which is easily prepared for production steps and good in productivity.

SUMMARY OF THE INVENTION

A first object of the present invention is to provide a process for producing a conductive rubber roller for electrophotographic apparatus, such as a transfer roller, a charging roller or a developing roller, having a foamed rubber layer, obtained by heating a rubber composition tube by irradiation with microwaves to foam and vulcanize it, having small aspect ratios of tube inner and outer diameters, having a stable measure of its inner diameter, having uniform cell distribution, and being free from the non-uniformity of hardness and electrical resistance in the peripheral direction; and a roller for electrophotographic apparatus.

A second object of the present invention is to provide a process for producing a conductive rubber roller used in image forming apparatus, having uniform cell distribution and being free from the non-uniformity of hardness and electrical resistance, a conductive rubber roller obtained by such a production process, and a transfer roller as a type of use of the rubber roller.

A third object of the present invention is to solve the problems discussed above, to provide a conductive rubber roller used in image forming apparatus, having uniform cell distribution and being free from non-uniform hardness, to provide a process for producing such a conductive rubber roller and to provide a transfer roller as a type of use of the rubber roller.

A fourth object of the present invention is to provide a process for producing a conductive rubber roller used in electrophotographic apparatus, having uniform cell distribution, being free from non-uniform hardness and electrical resistance and brought to wear at a minimum level, and to provide a conductive rubber roller as a resultant product of the process and a transfer roller as a type of use of the rubber roller.

A fifth object of the present invention is to provide a process for producing a conductive rubber roller for electrophotographic apparatus, such as a transfer roller, a charging roller or a developing roller, having a foamed rubber layer, obtained by heating an unvulcanized rubber composition tube by irradiation with microwaves to foam and vulcanize it, having small aspect ratios of tube inner and outer diameters, having uniform cell distribution, being free from the non-uniformity of hardness and electrical resistance in the peripheral direction, being small in resistivity variation due to a change in environment such as temperature and humidity, and having stable hardness; and to provide a roller for electrophotographic apparatus, and a transfer roller.

The invention for achieving the above first object (hereinafter referred to as the "first-object invention") is a process for producing a conductive rubber roller having a conductive core material and a foamed rubber layer provided thereon, wherein the foamed rubber layer is formed from a rubber composition containing epichlorohydrin rubber, acrylonitrile-butadiene rubber, an ethylene oxide-propylene oxide-allyl glycidyl ether terpolymer, or a mixture of any of these;

the process has an extrusion step of continuously extruding a tube composed of the rubber composition standing unvulcanized from a rubber extruder in a microwave vulcanizing unit, and a forming step of foaming and vulcanizing said tube by means of a microwave irradiator having a microwave irradiation zone of 4 m or less in length while being transported at a speed of from 0.5 to 3.0 m/min to form a foamed rubber tube; and the foamed rubber tube has an inner diameter smaller by from 20 to 35% than the outer diameter of the conductive core material over the whole region in the lengthwise direction of the conductive rubber roller, and the conductive core material is press-fitted into the foamed rubber tube without using any adhesive. The first-object invention is also a roller for electrophotographic apparatus, characterized in that the conductive rubber roller produced by the above conductive rubber roller production process of the present invention is used as a base layer member.

The invention for achieving the above second object (hereinafter referred to as the "second-object invention") is a process for producing a conductive rubber roller having a conductive core material and a rubber layer provided thereon;

the rubber layer containing at least acrylonitrile rubber, epichlorohydrin rubber and a blowing agent;

the rubber layer having a gas generation rate of from 2 ml/g·min to 4 ml/g·min at 170° C. to 230° C.; and the process having a vulcanizing and foaming step of vulcanizing and foaming the rubber layer by means of a microwave vulcanizing furnace which generates hot air and microwaves, where the temperature of the heating atmosphere in the microwave vulcanizing furnace in the vulcanizing and foaming step is so controlled that the ratio of initial vulcanizing time T10 to initial foaming time Tp10, T10/Tp10, of the rubber layer is from 1 or more to less than 3 and the T10 is within 90 seconds. In addition, the second-object invention is directed to the use of the above conductive rubber roller as a transfer roller set in a transfer mean of an image forming apparatus having an electrostatic photosensitive member, a charging means, an exposure means, a developing means and a transfer means.

The invention for achieving the above third object (hereinafter referred to as the "third-object invention") is a process for producing a conductive rubber roller having a conductive core material and a rubber layer provided thereon;

the rubber layer containing at least acrylonitrile rubber, epichlorohydrin rubber and carbon black; and the process having a kneading step of kneading the acrylonitrile rubber, the epichlorohydrin rubber and the carbon black in such a manner that the carbon black is in a content of from 5 to 30 parts by mass based on 100 parts by mass of the total of the rubbers, and a vulcanizing and foaming step of vulcanizing and foaming the rubber layer by means of a microwave vulcanizing furnace which generates hot air and microwaves of 2,450±50 MHz, where a dielectric loss coefficient $\in$r·tan δ of unvulcanized rubber through the kneading step is from 0.3 to 0.5. In addition, the third-object invention is directed to the use of the above conductive rubber roller as a transfer roller set in a transfer mean of an image forming apparatus having an electrostatic photosensitive member, a charging means, an exposure means, the developing means and a transfer means.

The invention for achieving the above fourth object (hereinafter referred to as the "fourth-object invention") is a process for producing a conductive rubber roller having a conductive core material and a foamed rubber layer provided thereon, wherein the foamed rubber layer is formed through a step of carrying out vulcanization and foaming by irradiation with microwaves and hot air in a microwave vulcanizing furnace which carries out irradiation with microwaves;

a transport means in the microwave vulcanizing furnace is a mesh belt coated with polytetrafluoroethylene; and the ratio of an outer diameter A (mm) of the rubber layer after the vulcanization to a mesh opening percentage B (%) of the mesh belt, A/B, is from 0.2 or more to 0.4 or less. The fourth-object invention is also a conductive rubber roller used in electrophotographic apparatus, which is produced by the above conductive rubber roller production process, and has a difference in Asker-C hardness of 1° or less in the peripheral direction. In addition, the fourth-object invention is directed to the use of the above conductive rubber roller as a transfer roller set in a transfer assembly of an electrophotographic apparatus.

The invention for achieving the above fifth object (hereinafter referred to as the "fifth-object invention") is a process for producing a conductive rubber roller having a conductive core material and a foamed rubber layer provided thereon, wherein;

the foamed rubber layer is formed from a rubber composition containing from 0.1 to 50.0 parts by mass, based on 100 parts by mass of the total polymer content, of an ethylene oxide-propylene oxide-allyl glycidyl ether terpolymer having the propylene oxide in a compositional proportion of from 1 to 20 mol % and the allyl glycidyl ether in a compositional proportion of from 5 to 15 mol %; and the process has an extrusion step of continuously extruding a tube composed of the rubber composition standing unvulcanized from a rubber extruder in a microwave vulcanizing unit having an output of from 0.1 to 1.5 kW, and a forming step of foaming and vulcanizing said tube by means of a microwave irradiator having a microwave irradiation zone of 4 m or less in length while being transported at a speed of from 0.5 to 3.0 m/min to form a foamed rubber tube. The fifth-object invention is also directed to a roller for electrophotographic apparatus, in particular, a transfer roller, characterized in that the conductive rubber roller produced by the above conductive rubber roller production process of the present invention is used as a base layer member.

According to the conductive rubber roller production process of the first-object invention, a conductive rubber roller can be provided which has a foamed rubber tube having small aspect ratios of inner and outer diameters of the foamed rubber tube, having uniform cell distribution and also being free from the non-uniformity of hardness and electrical resistance in the peripheral direction. In addition, a roller using as a base layer member the conductive rubber roller produced by the above conductive rubber roller production process can preferably be used as the roller for electrophotographic apparatus, in particular, as the transfer roller.

According to the conductive rubber roller production process of the second-object invention, the non-uniformity of foaming in the peripheral direction does not come about, and hence a conductive rubber roller can be provided which has uniform resistivity and hardness over the whole roller region.

According to the conductive rubber roller production process of the third-object invention, a conductive rubber roller can be provided which has, in particular, no cell non-uniformity especially in the peripheral direction, and is free from hardness non-uniformity.

According to the conductive rubber roller production process of the fourth-object invention, the contact area between the rubber layer before vulcanization and foaming and the transporting mesh belt is optimized to bring about no foaming non-uniformity, and hence a conductive rubber roller can be provided which has uniform resistivity and hardness over the whole roller region. Besides, since no foaming non-uniformity may come about, grinding may be carried out in a minimum quantity, thus an economically and environmentally favorable production process is provided.

According to the conductive rubber roller production process of the fifth-object invention, a conductive rubber roller can be provided which has a foamed rubber layer having uniform cells, is free from the non-uniformity of hardness and electrical resistance in the peripheral direction, and is small in variation in resistivity in low-resistance ranges because of a change in environmental such as temperature and humidity, and has stable hardness. Also, a roller using as a base layer member the conductive rubber roller produced by the above conductive rubber roller production process can preferably be used as the roller for electrophotographic apparatus, in particular, as the transfer roller.

Thus, the conductive rubber rollers produced by the above production processes can preferably be used as rollers for electrophotographic apparatus, in particular, as transfer rollers.

DESCRIPTION OF THE PREFERRED EMBODIMENTS

The present invention is described below in detail.

Figure 2:
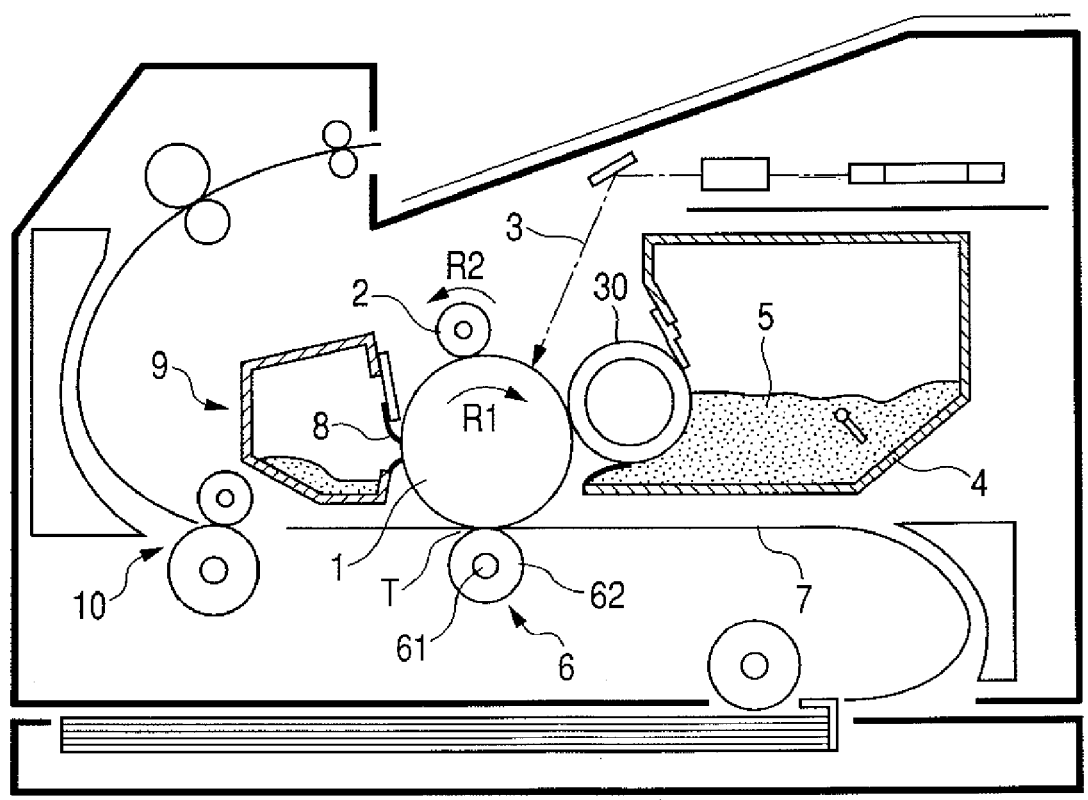
FIG. 2 is a sectional schematic view of an image forming apparatus having the conductive rubber roller, or the roller for electrophotographic apparatus, of the present invention.

Description of Relationship Between Conductive Rubber Roller of the Present Invention and Image Forming Apparatus An example of an image forming apparatus having the conductive rubber roller, or the roller for electrophotographic apparatus, of the present invention, is shown in FIG. 2. The image forming apparatus shown in FIG. 2 is a laser printer using a process cartridge, which is of an electrophotographic system. FIG. 2 is a vertical sectional view showing the outline of the construction of the laser printer. Also, in the image forming apparatus shown in FIG. 2, the conductive rubber roller or the roller for electrophotographic apparatus obtained in the present invention is used as a charging roller 2, a transfer roller 6 or a developing roller 30.

The image forming apparatus shown in FIG. 2 has a drum type electrophotographic photosensitive member (which is referred to also as a photosensitive drum) 1 as an image bearing member. The photosensitive drum 1 is one in which the periphery of a cylindrical aluminum support is provided with a photosensitive layer formed of an organic photoconductor (which is referred to also as an OPC). This photosensitive drum 1 is rotatively driven in the direction of an arrow R1 at a stated process speed (peripheral speed) of, e.g., 50 mm/s by a drive means (not shown).

The photosensitive drum 1 surface is uniformly charged by means of a charging roller 2 as a contact charging member. The charging roller 2 is disposed in contact with the photosensitive drum 1 surface, and is rotated in the direction of an arrow R2 as the photosensitive drum 1 is rotated in the direction of the arrow R1. To the charging roller 2, an oscillating voltage (alternating-current voltage VAC+direct-current voltage VDC) is applied from a charging bias applying power source (a high-voltage power source), whereby the photosensitive drum 1 surface is uniformly charged to −600 V (dark-area potential Vd). The photosensitive drum 1 surface thus charged is subjected to scanning exposure to laser light 3 emitted from a laser scanner and reflected from a mirror, i.e., laser light modulated according to time-sequential electrical digital image signals of the intended image information. Thus, electrostatic latent images (light-area potential Vl: −150V) corresponding to the intended image information are formed on the photosensitive drum 1 surface.

The electrostatic latent images are reverse-developed as toner images with a toner 5 charged negatively and adhered to the photosensitive drum 1 surface by the aid of a developing bias applied to a developing roller 30 of a developing assembly 4.

Meanwhile, a transfer medium 7 such as paper, fed and transported from a paper feed section (no shown), is guided by a transfer guide, and is fed to a transfer zone (transfer nip zone) T formed between the photosensitive drum 1 and the transfer roller 6, in such a manner as to be synchronized with the toner images held on the photosensitive drum 1. To the surface of the transfer medium 7 fed to the transfer zone T, the toner images held on the photosensitive drum 1 are transferred by the aid of a transfer bias applied to the transfer roller 6 from a transfer bias applying power source (not shown). Here, toner (residual toner) remaining on the photosensitive drum 1 surface without being transferred to the transfer medium 7 is removed by means of a cleaning blade 8 of a cleaning assembly 9.

The transfer medium 7 having passed through the transfer zone T is separated from the photosensitive drum 1 and led into a fixing assembly 10, where the toner images are fixed, and then put out of the image forming apparatus main body as an image formed matter (a print).

Description Concerning Conductive Rubber Roller Production Process

Figure 1:
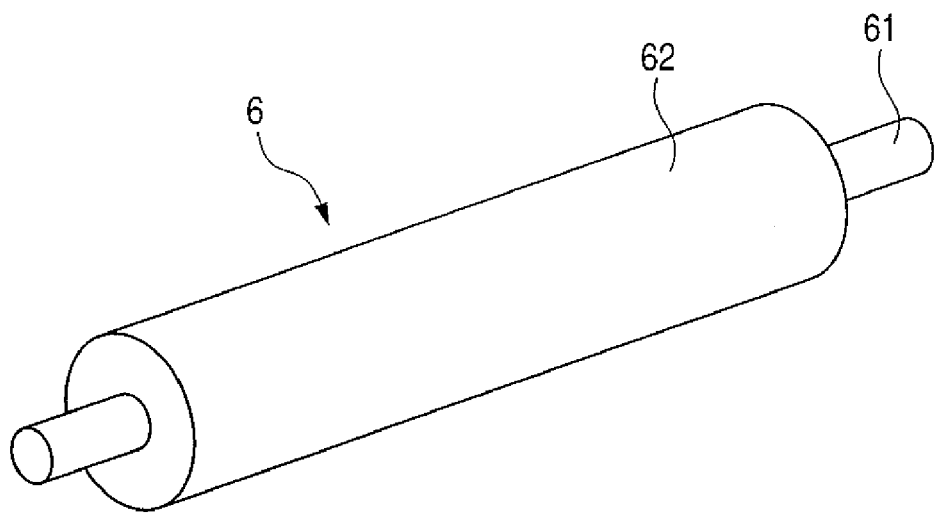
FIG. 1 is a perspective view of a conductive rubber roller according to an embodiment obtained in the present invention.

A conductive rubber roller according to an embodiment, obtained in the present invention, is shown in FIG. 1 as a perspective view.

The conductive rubber roller of the present invention has a conductive core material 61 and a foamed rubber layer 62 provided thereon. As the conductive core material 61, a round rod of a metallic material such as iron, copper or stainless steel may be used, which may preferably have an outer diameter of from 4 to 10 mm. The surface of such a rod may further be treated by plating, for the purposes of preventing rust and providing resistance to scratching.

In particular, the rubber composition which is a raw material for forming the foamed rubber layer 62 in the first-object invention contains epichlorohydrin rubber, acrylonitrile-butadiene rubber, an ethylene oxide-propylene oxide-allyl glycidyl ether terpolymer, or a mixture of any of these. If necessary, it further contains a blowing agent of an azodicarbonamide type; a vulcanizing agent such as sulfur, an organic peroxide, triazine or polyamine; a vulcanization accelerator of a thiuram type, a thiazole type, a guanidine type, a sulfenic amide type, a dithiocarbamate type or a thiourea type; a conducting agent such as carbon black; a filler such as calcium carbonate; and other auxiliaries. As the epichlorohydrin rubber, it is preferable to use, e.g., GECHRON 3106 (trade name), available from Nippon Zeon Co., Ltd.; as the acrylonitrile-butadiene rubber, e.g., DN 401 (trade name), available from Nippon Zeon Co., Ltd.; as the ethylene oxide-propylene oxide-allyl glycidyl ether terpolymer, e.g., ZEOSPAN 8030 (trade name), available from Nippon Zeon Co.; and, as the blowing agent of an azodicarbonamide type, e.g., VINYFOR AC (trade name), available from Eiwa Chemical Ind. Co., Ltd.

In particular, the raw-material rubber used in the second- to fourth-object inventions includes acrylonitrile-butadiene rubber, epichlorohydrin rubber or a mixture of these as a rubber chief component, which is mixed in a stated quantity. Besides, it is possible to use polymeric materials such as a polystyrene type polymeric material, a polyolefin type polymeric material, a polyester type polymeric material, a polyurethane type polymeric material, a polyvinyl chloride (PVC) or like thermoplastic elastomers, an acrylic resin, a styrene-vinyl acetate copolymer and a butadiene-acrylonitrile copolymer, and a mixture of any of these rubbers, elastomers or resins.

In the second- to fourth-object inventions, it is also possible to use a conducting agent such as carbon black, a filler such as calcium carbonate, and a material known as a conductive substance added in order to provide the rubber with conductivity. The conductive substance may include conductive particles and an ionic conducting agent. For example, the conductive particles may include conductive carbon black, metal oxides such as $TiO_2$, $SnO_2$, ZnO and a solid solution of $SnO_2$ and $SbO_3$, and powder of metal such as Cu and Ag. The ionic conducting agent may include $LiClO_4$ and NaSCN. Any of these may be added to and dispersed in the rubber singly or in combination, whereby the desired electrical resistance can be achieved. The rubber may be made conductive by introducing in the side chain or rubber backbone chain a molecule or the like having a polarity.

In the third-object invention, the carbon black is in a content of from 5 to 30 parts by mass based on 100 parts by mass of the total of the rubbers. If the content is less than 5 parts by mass, when the rubbers are irradiated with microwaves, the heat value of the rubbers may be insufficient to make the subsequent foaming reaction and vulcanization reaction incomplete. If, on the other hand, the content is more than 30 parts by mass, the heat value of the rubbers may be large, but where the carbon black is poorly dispersed, non-uniformity of heating may occur or the rubbers are excessively heated to undergo heat deterioration. In addition, there are no particular limitations concerning the type of the carbon black. One having an average particle diameter of from 70 to 100 nanometers may preferably be used.

As the blowing agent also used in the second- to fourth-object inventions, an ADCA (azodicarbonamide) type agent is particularly preferred. As other organic blowing agents, a DPT (dinitrosopentamethylenetetramine) type agent, a THS (p-toluenesulfonyl hydrazide type agent, an OBSH (oxybis-benzenesulfenyl hydrazide) type agent and the like may be used alone or in the form of a mixture. The decomposition temperature of the blowing agent may be lowered by adding, e.g., a blowing auxiliary agent such as urea resin or zinc oxide. The blowing agent used in the present invention has been controlled to be so formulated that, in the rubber formulation specified in the present invention, the gas generation rate at 170° C. to 230° C. is from 2 ml/g·min to 4 ml/g·min.

The blowing auxiliary agent used in the second- to fourth-object inventions may include urea type compounds, metal oxides such as zinc oxide and lead oxide, and compounds composed chiefly of salicylic acid, stearic acid or the like. A blowing auxiliary agent may be added which can be expected to appropriately act in conformity with the blowing agent used.

A vulcanizing agent used in the second- to fourth-object inventions may include sulfur and metal oxides. Various vulcanization accelerators are known. A thiazole type accelerator and a thiuram type accelerator may be used. The use of the thiazole type accelerator and the thiuram type accelerator in combination is commonly known to be effective in the expression of properties against the deformation of rubber due to compression (compression set). As a specific thiazole type accelerator, 2-mercaptobenzothiazole and dibenzothiazyl disulfide are available. In the present invention, the dibenzothiazyl disulfide is preferred as being less in scorch properties involved with storage stability of unvulcanized materials and being usable in combination with the thiuram type accelerator. The thiuram type accelerator may include tetramethylthiuram monosulfide, tetraethylthiuram disulfide, tetrakis(2-ethylhexyl)thiuram disulfide, and dipentamethylenethiuram tetrasulfide. The tetrakis(2-ethylhexyl)thiuram disulfide is preferred as having superior anti-scorch properties. In addition, as to other thiazole type accelerators and thiuram accelerators as well, they are usable in the present invention as long as their use conditions are adjusted.

In particular, as the thiuram type accelerator in the second-object invention, it is preferable to use one having a molecular weight of from 200 or more to 650 or less. In virtue of its use, the balance between the initial vulcanizing time T10 and the initial foaming time Tp10 is controlled. If it has a molecular weight of less than 200, the vulcanization rate may come so high as to make it difficult to effect sufficient foaming in the microwave vulcanization. If, on the other hand, it has a molecular weight of more than 650, problems are liable to be raised in that the cross-link density may be reduced so as for foam cells to become large, not only resulting in low hardness, but also bringing about white lines on images because of the compression set of the roller.

In particular, the rubber composition which is a raw material for forming the foamed rubber layer 62 in the fifth-object invention contains 0.1 to 50.0 parts by mass, based on 100 parts by mass of the whole polymer content, of a terpolymer composed of ethylene oxide, propylene oxide and allyl glycidyl ether, in which the propylene oxide is in a compositional proportion of from 1 to 20 mol % and the allyl glycidyl ether is in a compositional proportion of from 5 to 15 mol %. As other polymer contents, the following may be contained: epichlorohydrin rubber, acrylonitrile-butadiene rubber, EPDM, butadiene rubber, styrene-butadiene rubber, isoprene rubber, butyl rubber and chloroprene rubber, or a mixture of any of these. If necessary, the following may be further contained: a blowing agent of an azodicarbonamide type; a vulcanizing agent such as sulfur, an organic peroxide, triazine or polyamine; a vulcanization accelerator of a thiuram type, a thiazole type, a guanidine type, a sulfenamide type, a dithio-carbamate type or a thiourea type; a reinforcing agent such as carbon black; a filler such as calcium carbonate; and other auxiliaries. As the ethylene oxide-propylene oxide-allyl glycidyl ether terpolymer, it is preferable to use, e.g., one having the ethylene oxide, the propylene oxide and the allyl glycidyl ether in compositional proportions of from 86.0 to 88.0 mol %, from 1.2 to 1.4 mol % and from 11.0 to 13.0 mol %, respectively, and ZEOSPAN 8030 (trade name) available from Nippon Zeon Co.; as the epichlorohydrin rubber, e.g., GECHRON 3106 (trade name) available from Nippon Zeon Co., Ltd.; as the acrylonitrile-butadiene rubber, e.g., DN 401 (trade name) available from Nippon Zeon Co., Ltd.; and as the blowing agent of an azodicarbonamide type, e.g., VINYFOR AC (trade name) available from Eiwa Chemical Ind. Co., Ltd.

In the present invention, there are no particular limitations concerning a method for preparing the rubber composition from the above respective components. For example, what is suitable may be selected from known methods in accordance with raw materials to be used, composition and so forth. Specifically, for example, the prescribed components such as the rubber component, the blowing agent, the conducting agent, the vulcanizing agent and the vulcanization accelerator may be kneaded by means of, e.g., a closed kneading machine such as a Banbury mixer or a kneader to prepare the rubber composition.

Figure 3:
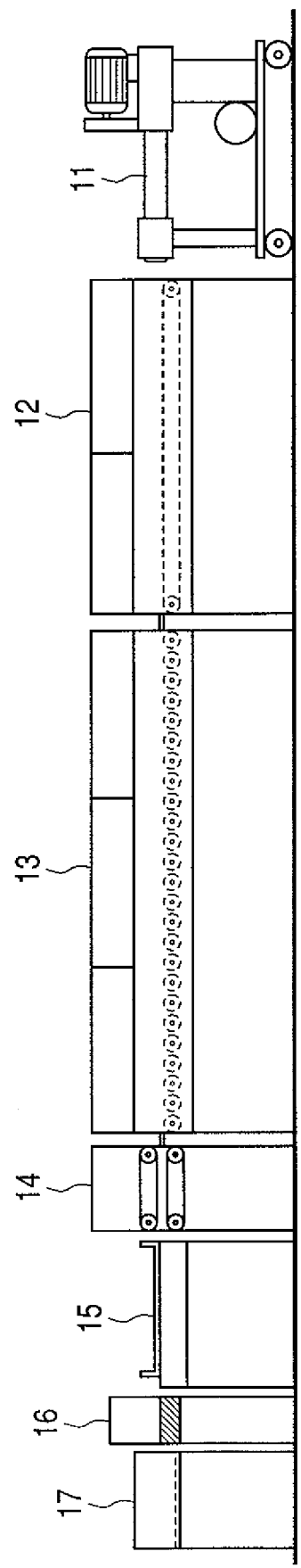
FIG. 3 is a sectional schematic view of an example of a vulcanizing forming system used in the present invention.

An example of a vulcanizing forming system usable in the present invention is shown in FIG. 3. This system is constituted of an extruder 11, a microwave vulcanizing unit (which is referred to also as a UHF vulcanizing unit) 12 as a warming and heating means, a hot-air vulcanizing unit (which is referred to also as an HAV vulcanizing unit) 13 which is a hot-air heating means used as needed, a take-off gear 14, a cooling bath 15, a gauge cutter 16 and an automatic core material press-fit machine 17.

The rubber composition described above, having been prepared by kneading materials by means of, e.g., a closed kneader such as a Banbury mixer or a kneader, is shaped into a ribbon by using an open roll and a ribbon shaping and sheeting machine (not shown), and thereafter introduced into the extruder 11. The UHF vulcanizing unit 12 has a mesh belt coated with polytetrafluoroethylene (PTFE) or rollers covered with PTFE, and an unvulcanized rubber composition tube extruded from the extruder 11 is conveyed thereon, and while being conveyed, is irradiated with microwaves and heated so as to be foamed and vulcanized (or foaming-vulcanized), thus a foamed rubber tube is formed. This foamed rubber tube is transported to the HAV vulcanizing unit 13. The UHF vulcanizing unit 12 and the HAV vulcanizing unit 13 are connected through rollers covered with PTFE. The HAV vulcanizing unit 13 has rollers covered with PTFE, and the foamed rubber tube is conveyed thereon and, while being conveyed, exposed to hot air and heated, and further vulcanized. The foamed rubber tube is taken off by means of the take-off gear 14. Immediately after discharged from the take-off gear 14, the tube is cooled in the cooling bath 15, and then cut in desired size by means of the gauge cutter 16. Thereafter, a core material is subsequently press-fitted into the conductive rubber tube by means of the automatic core material press-fit machine 17. Thus a foamed rubber tube having conductivity is prepared.

The UHF vulcanizing unit 12, the HAV vulcanizing unit 13, the take-off gear 14, the cooling bath 15, the gauge cutter 16 and the automatic core material press-fit machine 17 are, in this embodiment, 4 m, 6 m, 1 m, 1 m, 1.5 m and 2 m, respectively. The distance between the UHF vulcanizing unit 12 and the HAV vulcanizing unit 13 and the distance between the HAV vulcanizing unit 13 and the take-off gear 14 are each so set as to be from 0.1 to 1.0 m.

Subsequently, the foamed rubber tube is transported to the HAV vulcanizing unit 13 and, while being transported, heated in a hot-air furnace of the HAV vulcanizing unit 13 to complete the vulcanization. There are no particular limitations on heating conditions in the hot-air furnace of the HAV vulcanizing unit 13. Usually, such hot-air heating may preferably be carried out at 150 to 300° C. for 2 minutes to 10 minutes. In addition, the hot-air furnace of the HAV vulcanizing unit 13 may preferably be one having a gas furnace as a heat source. Inasmuch as the hot-air furnace has a gas furnace as a heat source, a uniform state of heating is achieved in virtue of water vapor generated in a slight quantity at the time of gas combustion.

The foamed rubber tube obtained after the vulcanization has been completed is taken off by means of the take-off gear 14 and, immediately after discharged from the take-off gear 14, cooled in the cooling bath 15, and then cut in desired size by means of the gauge cutter 16.

In particular, in the first-object invention, in the above vulcanizing forming system, the unvulcanized rubber composition tube formed by extruding the rubber composition into a tube by means of the extruder 11 is, immediately after it has been extruded form the extruder 11, transported to the interior of the UHF vulcanizing unit 12, and is transported at a transport speed (or a feed rate) of from 0.5 to 3.0 m/min through the interior of the UHF vulcanizing unit. In the interior of the UHF vulcanizing unit 12, the tube is irradiated with microwaves having preferably an irradiation output of from 0.3 to 3.0 kW, by using a microwave irradiator having a microwave irradiation zone of 4 m or less in length, to foam and vulcanize the rubber composition tube to form the foamed rubber tube.

The microwave irradiation zone is 4 m or less in length, and may preferably be set to be 3 m or less in length. Then, the limit of the length is considered to be about 1 m. As long as the microwave irradiation zone is set to be 4 m or less in length, a uniform and stable state of foaming is obtained to create a uniform measure of the inner diameter. In the case of about 1 m as the limit, there is a possibility of sparking, and it is not practical. The transport speed is from 0.5 to 3.0 m/min, and may preferably be set at from 1.0 to 3.0 m/min. As long as the transport speed is set at 0.5 m/min or more, a more stable state of vulcanization is obtained. Also, as long as the transport speed is set at 3.0 m/min or less, a more stable state of foaming is obtained to create a uniform measure of the inner diameter. The microwave irradiation output may preferably be set at from 0.3 to 3.0 kW, and more preferably from 0.3 to 2.0 kW. As long as the microwave irradiation output is set at 0.3 kW or more, sufficient irradiation can be effected even where the system is set up to be short. On the other hand, as long as microwave irradiation output is set at 3.0 kW or less, the tube can easily be prevented from being heated in excess, enabling the control to be facilitated even where a conductive rubber roller whose inner diameter is required to have a precise measure is produced.

In the first-object invention, the foamed rubber tube thus formed by foaming and vulcanization is also required to have an inner diameter (b) which is set to be smaller by from 20 to 35%, and preferably by from 20 to 30%, than the outer diameter (a) of the conductive core material over the whole region in the lengthwise direction of the conductive rubber roller. If less than 20%, a problem may occur such that the foamed rubber tube comes off the conductive core material. If more than 35%, a problem may occur such that the conductive core material cannot be press-fitted.

After the foamed rubber tube has been cut by means of the gauge cutter 16, the conductive core material not coated with an adhesive such as a hot-melt adhesive or a vulcanizing adhesive is press-fitted into the inner-diameter part of the foamed rubber tube by means of the automatic core material press-fit machine 17 so as to be covered with the foamed rubber tube having conductivity.

In particular, in the second-object invention, the microwaves may preferably be at an intensity of from 0.5 to 3.0 kW in the above UHF vulcanization. If the intensity is less than 0.5 kW, the temperature does not rise, and hence both the vulcanization and the foaming tend to be insufficient. On the other hand, if irradiated at an intensity of more than 3.0 kW, the rubber is heated to 250° C. or more to become vulcanized in excess, and further there is in danger of ignition. This is undesirable not only in view of quality but also in respect of production. In this regard, the temperature of the heating atmosphere of the UHF vulcanization is so controlled that the ratio of initial vulcanizing time T10 to initial foaming time Tp10, T10/Tp10, of the rubber layer is from 1 or more to less than 3 and the T10 is within 90 seconds. When setting temperature conditions in such a manner, the foaming and vulcanization of the rubber layer can proceed in a well balanced state and a rubber tube free from foaming non-uniformity can be produced. More specifically, if the temperature of the atmosphere brings T10/Tp10 to less than 1, the vulcanization proceeds faster than the foaming to make it difficult to form cells. If, on the other hand, the temperature of the atmosphere brings T10/Tp10 to 3 or more, the foaming reaction proceeds faster than the vulcanization reaction. In particular, in the UHF vulcanizing furnace, the whole rubber is uniformly heated with microwaves at a high rate, and hence the foaming reaction is rapidly accelerated. However, since T10/Tp10 is 3 or more, the vulcanization can not follow the foaming to make it difficult to form cells uniformly. In particular, where the temperature of the rubber tube is higher than the temperature of the atmosphere, the surface of the rubber tube radiates heat to produce a temperature difference between the surface and the interior. As a result, the vulcanization proceeds slowly in the vicinity of the surface, and hence foaming non-uniformity tends to come about in the vicinity of the surface.

The temperature of the heating atmosphere of the UHF vulcanizing furnace is also required to be set and managed at such a temperature that the T10 is within 90 seconds. With a temperature at which the T10 is more than 90 seconds, the vulcanization does not proceed sufficiently in the UHF vulcanizing furnace and the vulcanization proceeds from the outside to the inside in the HAV vulcanization. Hence, the rubber tube comes to have larger cells on the outer-diameter side. Further, where the microwaves are set at a high output, the temperature may differ greatly between the rubber tube surface and the interior so as to create foaming non-uniformity.

In addition, in the second-object invention, the rubber layer has a gas generation rate of from 2 ml/g·min to 4 ml/g·min at 170° C. to 230° C. When the rubber layer temperature, i.e., the temperature of the heating atmosphere in the UHF vulcanizing furnace is so controlled as to give this gas generation rate, the foaming reaction can be completed in the system used in the second-object invention. If the gas generation rate is less than 2 ml/g·min, the foaming may become insufficient. If, on the other hand, more than 4 ml/g·min, outgassing may occur. Also, the foam cells are controlled to be uniform and be 0.3 mm or less in diameter by properly adjusting the T10/Tp10, the T10 and the gas generation rate as shown above. A case in which the cells are more than 0.3 mm in diameter is undesirable because, in the transfer roller, marks of cells tend to remain on the photosensitive drum.

In particular, in the third-object invention, the dielectric loss coefficient ∈r·tan δ in the unvulcanized rubber of the rubber layer is from 0.3 to 0.5. This defines the range within which the step of vulcanization and foaming in virtue of the irradiation with microwaves proceeds well in producing the conductive rubber roller such as a transfer roller having a rubber layer containing a polar rubber applicable in the third-object invention. If the dielectric loss coefficient deviates from this range, e.g., if it is less than 3, the heating by microwave irradiation is insufficient and the vulcanization does not proceed or is incomplete. If, on the other hand, more than 0.5, the heating may become excessive so that there is a fear that the rubber layer deteriorates due to heat.

In the third-object invention, the irradiation with microwaves is required to be carried out using microwaves of 2,450±50 MHz in the UHF vulcanizing unit 12, which is set at an in-furnace atmosphere temperature of, e.g., 200° C. When using microwaves of 2,450±50 MHz, irradiation non-uniformity is reduced and the rubber tube can be irradiated in good efficiency. The hot air in the UHF vulcanizing furnace may preferably be at a temperature of from 150° C. to 250° C., and particularly from 180° C. to 230° C.

In particular, in the fourth-object invention, the rubber tube extruded from the extruder 11 is required to be transported on a mesh belt coated with PTFE. In the mesh belt, there are no particular limitation concerning its base material, provided that its surface is required to be coated with PTFE so as not to adhere the rubber layer and also that a material having small heat capacity and heat resistance is preferred in order to prevent temperature non-uniformity at contact portions. Although there are also no particular limitation concerning the shape of mesh openings of the mesh belt, a shape such as a lattice shape resistant to heating conditions and a certain degree of tension is often used.

The mesh belt is so made up that the ratio of outer diameter A (mm) of the rubber layer after the vulcanization to mesh opening percentage B (%) of the mesh belt, A/B, is from 0.2 or more to 0.4 or less. Inasmuch as the ratio is set to be within this range, the area in contact with the mesh belt can be minimized and the rubber layer can be made free from foaming non-uniformity. If this ratio deviates from this range, e.g., if the A/B is less than 0.2, the mesh opening percentage with respect to the tube outer diameter is large and the contact area is small, but the mass of the rubber layer applied to the contact portions becomes large. Hence, mesh contact marks may seriously remain on the rubber layer because the viscosity is reduced at the time of vulcanization. If, on the other hand, it is more than 0.4, the mesh opening percentage with respect to the tube outer diameter is so large as to raise a problem in the circulation of hot air in the UHF vulcanizing furnace.

In particular, in the fifth-object invention, the output per microwave oscillator is required to be set at from 0.1 to 1.5 kW, and preferably from 0.15 to 1.0 kW. As long as the microwave irradiation output is set at 0.1 kW or more, sufficient irradiation can be effected even where the system is set up to be short. On the other hand, as long as the microwave irradiation output is set at 1.5 kW or less, the tube can be easily prevented from being heated in excess, enabling the control to be facilitated even where a conductive rubber roller required to undergo uniform foaming is produced. It is preferable for the microwave irradiator to use two or four microwave oscillators having an output of from 0.1 to 1.5 kW per oscillator. It is more preferable to use four microwave oscillators each having an output of from 0.1 to 1.5 kW. If one oscillator or three oscillators each having an output of from 0.1 to 1.5 kW is/are used, the microwaves may be reflected irregularly in the unit to tend to make it difficult to effect uniform vulcanization and foaming. If on the other hand five or more oscillators each having an output of from 0.1 to 1.5 kW are used, the tube may be irradiated with microwaves in excess to tend to bring about a non-uniformly foamed state, and further a problem may be raised in that the roller has a resistivity higher than the desired resistivity.

In the fifth-object invention, in the above vulcanizing forming system, the unvulcanized rubber composition tube formed by extruding the rubber composition into a tube by means of the extruder 11 is, immediately after it has been extruded form the extruder 11, transported to the interior of the UHF vulcanizing unit 12, and is conveyed at a transport speed of from 0.5 to 3.0 m/min through the interior of the UHF vulcanizing unit. In the interior of the UHF vulcanizing unit 12, the tube is irradiated with microwaves by using a microwave irradiator having a microwave irradiation zone of 4 m or less in length, preferably by using the microwave irradiator using two or four microwave oscillators having an output of from 0.1 to 1.5 kW per oscillator, to foam and vulcanize the rubber composition tube to form the foamed rubber tube.

In the fifth-object invention, the transport speed is from 0.5 to 3.0 m/min, and is more preferably set at from 1.0 to 3.0 m/min. As long as the transport speed is set at 0.5 m/min or more, a more stable state of vulcanization is obtained. Also, as long as the transport speed is set at 3.0 m/min or less, a more stable state of foaming is obtained to give a uniform measure of the inner diameter. Also, the microwave irradiation zone is 4 m or less in length, and is preferably set to be 3 m or less in length. The limit of the length is considered to be about 1 m taking the possibility of sparking into account. As long as the microwave irradiation zone is set to be 4 m or less in length, a uniform and stable state of foaming is obtained to give a uniform measure of the inner diameter. Also, the tube is cut by means of the gauge cutter 16, and thereafter, the conductive core material is subsequently press-fitted into the inner-diameter part of the foamed rubber tube by means of the automatic core material press-fit machine 17 so as to be covered with the foamed rubber tube having conductivity. The conductive core material used here may be either one coated with an adhesive such as a hot-melt adhesive or a vulcanizing adhesive, or one not coated with any adhesive.

Subsequently, this roller-shaped form is set on a grinder (not shown), and is ground under given grinding conditions to produce a conductive rubber roller having a given outer diameter.

The conductive rubber roller obtained may be used as a base layer member to produce a roller for electrophotographic apparatus, such as a charging roller, a developing roller or a transfer roller.

In addition, for example, the developing roller and the charging roller may be optionally provided, on the peripheral surface of the foamed rubber layer of the conductive rubber roller, with layers for imparting desired functions, such as a bleed-out preventive layer which prevents the low-molecular weight components and compounded chemicals such as stearic acid from bleeding out of the foamed rubber layer, an electrode layer, an electrical resistance control layer which controls electrical properties, and a cover layer provided in order for the photosensitive member not to be scratched or contaminated. As methods for providing the bleed-out preventive layer, the electrode layer, the electrical resistance control layer, the cover layer and so forth, known methods are available as exemplified by a method using coating fluids, such as dip coating or roll coating, and a method in which a simultaneously formed multi-layer seamless tube is applied.

For example, the transfer roller may be optionally provided, on the peripheral surface of the foamed rubber layer of the conductive rubber roller, with layers for imparting desired functions, such as a bleed-out preventive layer which prevents low-molecular weight components and compounded chemicals such as stearic acid from bleeding out of the foamed rubber layer, an electrical resistance control layer which controls electrical properties, and a surface property control layer which controls surface properties in order to improve properties of transporting transfer mediums. These layers may be formed by the same methods as in those of the developing roller and charging roller. Also, where the conductive rubber roller has the desired performance, it may be used as the transfer roller as it is.

The present invention is described below in greater detail by giving Examples. In the Examples, while the transfer roller is particularly described, the present invention is by no means limited only to the transfer roller, and is also applicable to the charging roller and the developing roller.

EXAMPLES 1-1 to 1-5 & COMPARATIVE EXAMPLES 1-1 to 1-5

Conductive rubber rollers (FIG. 1) for demonstrating the present invention were produced in the following way.

75 parts by mass of acrylonitrile-butadiene rubber (DN401, trade name, available from Nippon Zeon Co., Ltd.), 23 parts by mass of epichlorohydrin rubber (GECHRON 3106, trade name, available from Nippon Zeon Co., Ltd.), 2 parts by mass of ethylene oxide-propylene oxide-allyl glycidyl ether terpolymer (ZEOSPAN 8030, trade name, available from Nippon Zeon Co., Ltd.), 4 parts by mass of azodicarbonamide (VINYFOR AC, trade name, available from Eiwa Chemical Ind. Co., Ltd.), 1 part by mass of stearic acid (LUNAC S20, trade name, available from Kao Corporation), 5 parts by mass of zinc oxide (Zinc White JIS 1, trade name, available from Hakusui Chemical Industries, Ltd.) and 10 parts by mass of carbon (ASAHI 35, trade name, available from Asahi Carbon Co., Ltd.) were kneaded by means of a Banbury mixer, and the kneaded product was shaped into a ribbon by using an open roll and a ribbon shaping and sheeting machine. This rubber composition shaped into a ribbon was introduced in the extruder 11 (manufactured by Micro Denshi Co., Ltd.) of the vulcanizing forming system shown in FIG. 3, and unvulcanized rubber composition tubes were extruded under various conditions.

The rubber composition tubes thus obtained were each heated by means of the UHF vulcanizing unit 12 (manufactured by Micro Denshi Co., Ltd.) in a microwave irradiation zone of 4 m and under conditions shown in Tables 1-1 and 1-2, to effect foaming and vulcanization. The foamed tube obtained was taken off by means of the take-off gear 14. Immediately after discharged out of the take-off gear 14, the tube was cooled in the cooling bath 15, and then cut in desired size by means of the gauge cutter 16 to produce a foamed rubber tube of 16.0 mm in outer diameter, 4.2 mm in inner diameter and 250 mm in length. Thereafter, subsequently, a conductive core material of 6 mm in outer diameter, having not been coated with any adhesive was press-fitted to the inner-diameter part of the foamed rubber tube by means of the automatic core material press-fit machine 17 to produce a roller-shaped form having the foamed rubber tube as a foamed rubber layer. This roller-shaped form was set on a grinder (not shown) fitted with a grindstone GC80, and was so ground as to have an outer diameter of 17 mm, under grinding conditions of a rotational speed of 2,000 rpm and a feed rate of 0.5 m/minute. Thus, conductive rubber rollers were produced.

The measurement of aspect ratios of inner and outer diameters of each foamed rubber tube at the time of irradiation with microwaves, the evaluation of cell diameter distribution of each foamed rubber tube, the evaluation of press-fit performance, the measurement of hardness non-uniformity of each conductive rubber roller and the measurement of electrical resistance non-uniformity of each conductive rubber roller in the Examples and Comparative Examples were made in the following way. Results obtained are shown in Tables 1-1 and 1-2.

How to Measure Outer Diameter of Conductive Core Material and Inner Diameter of Foamed Rubber Tube:

The outer diameter (a) of the conductive core material and the inner diameter (b) of the foamed rubber tube were each measured with a vernier caliper and a pin gauge to determine the proportion of the difference between them [{(a−b)/a}× 100]. It is desirable that the proportion of said difference is from 20 to 35%.

Press-Fit Performance:

When the conductive core material was press-fitted into the foamed rubber tube, a case in which the conductive core material was able to be press-fitted was evaluated as "A", a case in which the conductive core material was able to be press-fitted, but the foamed rubber tube was broken or came off was evaluated as "B", and a case in which the conductive core material was unable to be press-fitted at all was evaluated as "C".

How to Measure Aspect Ratios of Inner and Outer Diameters of Foamed Rubber Tube:

The foamed rubber tube was cut at arbitrary positions, and the sections were projected by using a projector (Profile Projector V-12B, trade name, manufactured by Nikon Corporation), and the maximum ($t_{max}$) and minimum ($t_{min}$) of each of the inner diameter and outer diameter of each of the projected sections were measured and the ratio of $t_{max}/t_{min}$ was determined. It is preferable that this ratio is close to 1.

How to Measure Hardness Non-Uniformity of Conductive Rubber Roller:

Using a hardness meter (Asker-C type; load: 4.9 N), the hardness of the foamed rubber layer of the conductive rubber roller was measured at four spots (one spot for each 90 degrees in the peripheral direction at an arbitrary position). The difference between the maximum value and minimum value of the hardness was determined and regarded as non-uniformity of hardness. It is preferable that the non-uniformity of hardness is close to 0.

How to Evaluate Cell Diameter Distribution of Foamed Rubber Tube:

The foamed rubber tube was cut at arbitrary positions, and its sections were recorded by using a video microscope (Digital Microscope VH-8000, trade name, manufactured by Keyence Corporation). The difference in measure between the cell diameter on the outer-diameter side and the cell diameter on the inner-diameter side was ascertained by measuring them with a gauge displayed on a monitor of the video microscope. It is preferable that there is no difference between the cell diameter on the outer-diameter side ($D_{ou}$) and the cell diameter on the inner-diameter side ($D_{in}$). Evaluation was made according to the following criteria.

A: There is no difference; $(|D_{ou}-D_{in}|/D_{ou}) \leq 1.5$ or $(|D_{ou}-D_{in}|/D_{in}) \leq 1.5$.

B: There is a little difference; $1.5 < (|D_{ou}-D_{in}|/D_{ou}) \leq 2.0$ or $1.5 < (|D_{ou}-D_{in}|/D_{in}) \leq 2.0$.

C: There is a difference; $(|D_{ou}-D_{in}|/D_{ou}) > 2.0$ or $(|D_{ou}-D_{in}|/D_{in}) > 2.0$.

How to Measure Non-Uniformity of Electrical Resistance of Conductive Rubber Roller:

After being left standing for 48 hours in an environment of 23° C./55% RH, the conductive rubber roller was brought into pressure contact with a drum 30 mm in outer diameter made of aluminum under the application of a load of 4.9 N to each of both end portions of the shaft of the roller. In the state this was rotated, a voltage of 2 kV was applied between the conductive core material of the conductive rubber roller and the drum made of aluminum to measure the electrical resistance. The difference in resistance value between the maximum value $R_{max}$ and the minimum value $R_{min}$, $R_{max}-R_{min}$, thus measured was expressed by the difference in power $[\log(R_{max}/R_{min})]$. It is preferable that the non-uniformity of the electrical resistance is of the power of less than 1.2.

As shown in Table 1-1, in Examples 1-1 to 1-5, tubes are irradiated with microwaves at a total irradiation output of from 0.3 to 3.0 kW while they are transported at a transport speed of from 0.5 to 3.0 m/min in the microwave vulcanizing unit having a microwave irradiation zone of 4 m or less. It is seen that in such cases, the conductive core materials are satisfactorily press-fitted into the foamed rubber tubes (good press-fit performance), the aspect ratios of the inner and outer diameters of each foamed rubber tube are as small as 1.05 or less, and also the cell diameter distributions are uniform. It is further seen that the conductive rubber rollers are small in the non-uniformity of hardness in their peripheral directions, and also have the non-uniformity of electrical resistance of the power as small as 1.05 or less.

On the other hand, in Comparative Examples 1-1 to 1-5, as shown in Table 1-2, examples are cited in which the microwave irradiation output is set at 0.1 kW, 1.5 kW, 2.0 kW or 4.0 kW and the transport speed at 0.3 m/min or 3.5 m/min. In Comparative Example 1-1, the foamed rubber tube came off the conductive core material after press-fitted. In Comparative Examples 1-3 and 1-4, the core materials was able to be press-fitted into the foamed rubber tubes, but the tubes were broken or torn, and were unable to be made up as conductive rubber rollers. Also, in Comparative Examples 1-2 and 1-5, the foamed rubber tubes had so small an inner diameter that the conductive core materials were unable to be press-fitted. Further, it is seen that the cell diameter distribution is poor and also the aspect ratios of the inner and outer diameters of each foamed rubber tube are larger than those in Examples.

TABLE 1-1

| | Example | | | | |
|---|---|---|---|---|---|
| | 1-1 | 1-2 | 1-3 | 1-4 | 1-5 |
| Microwave irradiation output: (kW) | 0.3 | 1.0 | 1.5 | 2.0 | 3.0 |
| Transport speed: (m/min) | 0.5 | 0.5 | 2.0 | 3.0 | 3.0 |
| Conductive core material outer diameter a: (mm) | 5.0 | 6.0 | 10.0 | 8.0 | 6.0 |
| Foamed rubber tube inner diameter b: (mm) | 4.0 | 3.9 | 8.0 | 5.2 | 4.8 |
| ((a − b)/a) × 100: (%) | 20 | 35 | 20 | 35 | 20 |
| Press-fit performance: | A | A | A | A | A |
| Tube aspect ratio (outer diameter): | 1.01 | 1.01 | 1.05 | 1.03 | 1.01 |
| Tube aspect ratio (inner diameter): | 1.00 | 1.01 | 1.02 | 1.03 | 1.02 |
| Hardness nonuniformity: | 0 | 0 | 1 | 1 | 0 |
| Electrical resistance nonuniformity: (power) | 1.02 | 1.03 | 1.04 | 1.05 | 1.03 |
| Cell diameter distribution: | A | A | A | A | A |

TABLE 1-2

| | Comparative Example | | | | |
|---|---|---|---|---|---|
| | 1-1 | 1-2 | 1-3 | 1-4 | 1-5 |
| Microwave irradiation output: (kW) | 0.1 | 4.0 | 1.5 | 1.5 | 2.0 |
| Transport speed: (m/min) | 0.3 | 3.5 | 3.5 | 0.3 | 0.3 |

TABLE 1-2-continued

|  | Comparative Example | | | | |
| --- | --- | --- | --- | --- | --- |
|  | 1-1 | 1-2 | 1-3 | 1-4 | 1-5 |
| conductive core material outer diameter a: (mm) | 5.0 | 6.0 | 6.0 | 10.0 | 8.0 |
| Foamed rubber tube inner diameter b: (mm) | 4.3 | 3.6 | 5.4 | 8.8 | 4.8 |
| ((a − b)/a) × 100: (%) | 15.0 | 40.0 | 10.0 | 12.0 | 40.0 |
| Press-fit performance: | B | C | B | B | C |
| Tube aspect ratio (outer diameter): | 2.1 | 2.3 | 2.6 | 2.5 | 3.1 |
| Tube aspect ratio (outer diameter): | 3.0 | 2.1 | 2.5 | 2.6 | 2.6 |
| Hardness nonuniformity: | NM | NM | NM | NM | NM |
| Electrical resistance nonuniformity: (power) | NM | NM | NM | NM | NM |
| Cell diameter distribution: | C | C | C | C | B |

NM: Not measurable.

EXAMPLES 2-1 to 2-9 & COMPARATIVE EXAMPLES 2-1 to 2-6

Immediately after tubes were each discharged out of the take-off gear after vulcanization and foaming, they were cut in desired size by means of the gauge cutter to produce tubular conductive rubber forms. Subsequently, conductive core materials of from 4 to 10 mm in diameter coated with a hot-melt adhesive or a vulcanizing adhesive at their desired regions were press-fitted into the inner-diameter part of the tubular conductive rubber forms to produce roller-shaped forms. These forms were each set on a grinder (not shown) fitted with a grindstone GC80, and were each so ground as to have an outer diameter of from 16 to 20 mm, under grinding conditions of a rotational speed of 2,000 rpm and a feed rate of 500 mm/minute. Thus, conductive rubber rollers were produced.

In addition, formulation and parts by mass of materials used in each of the Examples and Comparative Examples are as follows: (by mass)

Acrylonitrile-butadiene rubber (trade name: DN401LL; available from Nippon Zeon Co., Ltd.) 84 parts
Epichlorohydrin rubber (trade name: GECHRON 3106; available from Nippon Zeon Co., Ltd.) 16 parts
Conductive carbon black (trade name: ASAHI #35; available from Asahi Carbon Co., Ltd.) 10 parts
Zinc oxide (trade name: Zinc White JIS 2; available from Hakusui Tech Co., Ltd.) 5 parts
Stearic acid (trade name: LUNAC S; available from Kao Corporation) 1 part
Thiazole type accelerator: dibenzothiazyl disulfide (trade name: NOCCELER DM-P; available from Ohuchi-Shinko Chemical Industrial Co., Ltd.) 2 parts
Thiuram disulfide type accelerator: tetrakis(2-ethylhexyl)thiuram disulfide (trade name: NOCCELER TOT-N; molecular weight: 633.18; available from Ohuchi-Shinko Chemical Industrial Co., Ltd.) 2.5 parts
Sulfur (trade name: SULFAX PMC; available from Tsurumi Kagaku Kogyo K.K.) 2 parts
Azodicarbonamide (trade name; CELLMIC M257; available from Sankyo Kasei Co., Ltd.) 4 parts
Urea (trade name; CELLMIC M258; available from Sankyo Kasei Co., Ltd.) 2 parts In respect of the rubber layers made up in the above formulation as rubber materials, evaluation was made by the following methods changing UHF vulcanizing furnace atmosphere temperature, transport speed and microwave output. The results are shown in Tables 2-1 and 2-2.

How to Measure T10/Tp10:

Moving Die Rheometer MDR2000 (manufactured by Alpha Technologies, Inc.) was used, and a given amount of unvulcanized rubber was placed in a die set at a given temperature, to make measurement for vulcanization and foaming curves. The value of T10/Tp10 was calculated from the initial vulcanizing time T10 and initial foaming time Tp10 obtained.

How to Measure Rubber Temperature at the Time of Microwave Irradiation:

A fluorescent thermometer (a fluorescence type fiber thermometer FL-2000, manufactured by Anritsu Meter Co., Ltd.) was used, and a detector of the fluorescent thermometer was inserted to the interior of the unvulcanized rubber tube extruded from the extruder, and transported to the interior of the UHF vulcanizing furnace together with the unvulcanized rubber tube, thus the temperature was measured.

How to Measure Gas Generation Rate:

A gas tracer instrument (Gas Tracer 250, manufactured by Eiwa Chemical Ind. Co., Ltd.) was used, and 5 g of unvulcanized rubber to be used and 10 ml of liquid paraffin were put into a test tube. This test tube was immersed in an oil bath for 30 minutes which was set at arbitrary temperature within the temperature range of from 170° C. to 230° C. Gas generation quantity was measured at intervals of 10 seconds after the immersion. To find the gas generation rate, the gas generation quantity at the time the gas generation quantity reached equilibrium was divided by the time taken until the equilibrium was reached.

How to Measure Foam Cell Diameter:

The rubber tube was cut at arbitrary positions, and the sections were observed with a video microscope (Digital Microscope VH-8000, trade name, manufactured by Keyence Corporation). To make measurement, the foamed rubber tube was observed at 50 magnifications over the whole region from the inner-diameter side to the outer-diameter side, and the diameter of each cell was measured at N=30. The maximum value of the measured values was regarded as the cell diameter (width) of the rubber tube.

How to Measure Non-Uniformity of Hardness:

Using a hardness meter (Asker-C type; load: 4.9 N), the hardness of the tube made into the conductive roller was measured at four spots (one spot for each 90 degrees in the peripheral direction at an arbitrary position). The difference between the maximum value and minimum value of the hardness was expressed as hardness difference. It is preferable that the hardness difference is 0 or close to 0, or the closer to 0 the better.

How to Measure Non-Uniformity of Electrical Resistance:

To measure the electrical resistance of the roller, after being left standing for 48 hours in an environment of N/N (23° C./55% RH), the conductive rubber roller was brought into pressure contact with a drum 30 mm in outer diameter made of aluminum under application of a load of 4.9 N to each of both end portions of the shaft of the roller. In the state this was rotated, a voltage of 2 kV was applied between the shaft and the aluminum drum. The ratio of the maximum to the minimum of the resistance value thus measured was expressed as peripheral non-uniformity of resistance. It is preferable that the peripheral non-uniformity is 1.6 or less, and particularly preferably less than 1.2.

TABLE 2-1

| | Example | | | | | | | | |
|---|---|---|---|---|---|---|---|---|---|
| | 2-1 | 2-2 | 2-3 | 2-4 | 2-5 | 2-6 | 2-7 | 2-8 | 2-9 |
| UHF vulcanizing furnace atmosphere temperature: (° C.) | 200 | 200 | 200 | 180 | 180 | 180 | 170 | 170 | 170 |
| Transport speed: (m/min) | 1.2 | 2.4 | 3.2 | 1.2 | 2.4 | 3.2 | 1.2 | 2.4 | 3.2 |
| Microwave output: (kw) | 1.0 | 2.0 | 3.0 | 1.0 | 2.0 | 3.0 | 1.0 | 2.0 | 3.0 |
| Rubber layer ultimate temperature: (° C.) | 205 | 200 | 203 | 185 | 180 | 178 | 175 | 173 | 176 |
| Gas generation rate: (ml/g · min) | 3.5 | 3.5 | 3.5 | 3.0 | 3.0 | 3.0 | 2.2 | 2.2 | 2.2 |
| Gas generation level: (ml/g) | 16 | 16 | 16 | 14 | 14 | 14 | 12 | 12 | 12 |
| Initial vulcanizing time T10: (sec) | 18 | 18 | 18 | 33 | 33 | 33 | 49 | 49 | 49 |
| Initial foaming time Tp10: (sec) | 13 | 13 | 13 | 19 | 19 | 19 | 25 | 25 | 25 |
| T10/Tp10: | 1.38 | 1.38 | 1.38 | 1.74 | 1.74 | 1.74 | 1.96 | 1.96 | 1.96 |
| Cell diameter: (mm) | 0.24 | 0.22 | 0.22 | 0.24 | 0.21 | 0.23 | 0.25 | 0.26 | 0.26 |
| Foaming nonuniformity: | A | A | A | A | A | A | A | A | A |
| Electrical resistance peripheral nonuniformity: | 1.04 | 1.07 | 1.06 | 1.05 | 1.07 | 1.09 | 1.09 | 1.10 | 1.11 |
| Hardness difference: | 0.8 | 1.1 | 0.9 | 1.2 | 1.4 | 1.2 | 1.6 | 1.6 | 1.5 |

TABLE 2-2

| | Comparative Example | | | | | |
|---|---|---|---|---|---|---|
| | 2-1 | 2-2 | 2-3 | 2-4 | 2-5 | 2-6 |
| UHF vulcanizing furnace atmosphere temperature: (° C.) | 160 | 160 | 160 | 130 | 130 | 130 |
| Transport speed: (m/min) | 1.2 | 2.4 | 3.2 | 1.2 | 2.4 | 3.2 |
| Microwave output: (kw) | 1.0 | 2.0 | 3.0 | 1.0 | 2.0 | 3.0 |
| Rubber layer ultimate temperature: (° C.) | 160 | 158 | 162 | 125 | 130 | 128 |
| Gas generation rate: (ml/g · min) | 1.3 | 1.3 | 1.3 | 0.2 | 0.2 | 0.2 |
| Gas generation level: (ml/g) | 10 | 10 | 10 | 4 | 4 | 4 |
| Initial vulcanizing time T10: (sec) | 85 | 85 | 85 | 506 | 506 | 506 |
| Initial foaming time Tp10: (sec) | 28 | 28 | 28 | 99 | 99 | 99 |
| T10/Tp10: | 3.04 | 3.04 | 3.04 | 5.11 | 5.11 | 5.11 |
| Cell diameter: (mm) | 0.30 | 0.31 | 0.32 | 0.35 | 0.34 | 0.36 |
| Foaming nonuniformity: | B | B | B | C | C | C |
| Electrical resistance peripheral nonuniformity: | 1.12 | 1.15 | 1.14 | 1.34 | 1.32 | 1.37 |
| Hardness difference: | 3 | 2.5 | 2.8 | 5 | 5 | 5 |

Re Examples 2-1 to 2-9

As shown in Table 2, the ultimate temperature of the rubber layer is controlled by the temperature of the atmosphere and the microwave output in the UHF vulcanizing furnace. The condition for measurement was adjusted to the ultimate temperature of each rubber layer and gas generation rates during foaming were measured with the gas tracer instrument, where it was seen that the gas generation rates are within what was required in the present invention. Thus, the rubber layers are satisfactorily foamed, and the cells are uniform and free from non-uniformity. Further, the hardness difference is small, and the non-uniformity of electrical resistance is of the power of 1.6 or less.

Regarding Comparative Examples 2-1 to 2-6

In Comparative Example 2-1, the value of T10/Tp10 deviates from what is required in the present invention, and the vulcanization occurred later than the foaming. Hence, the cells formed were non-uniform, and non-uniformity of foaming came about. Also, in Comparative Example 2-4, the temperature of the atmosphere was set at 130° C., where both the T10 and the T10/Tp10 deviated from what was required in the present invention, and the vulcanization occurred greatly later than the foaming, so that great non-uniformity of foaming was seen. In other Comparative Examples, the vulcanization and foaming in some case were not completed in the UHF vulcanizing furnace or HAV vulcanizing furnace in the system presented in the present invention, and also in some cases, not only suitable rubber tube were not obtainable but also rollers were not producible. In the cases in which rollers were producible, great foaming non-uniformity of foaming came about, and the foam cells were more than 0.3 mm in diameter in some cases. Hence, non-uniformity of hardness and electrical resistance occurred seriously.

EXAMPLES 3-1 to 3-3 & COMPARATIVE EXAMPLES 3-1 to 3-3

Immediately after discharged out of the take-off gear subsequently to vulcanization and foaming, tubes were each cut in a desired size by means of the gauge cutter to produce tubular conductive rubber forms. Then, conductive core materials of from 4 to 10 mm in diameter coated with a hot-melt adhesive or a vulcanizing adhesive at their desired regions, were press-fitted into the inner-diameter part of the tubular conductive rubber forms to produce roller-shaped forms. These forms were each set on a grinder (not shown) fitted with a grindstone GC80, and were each so ground as to have an outer diameter of from 16 to 20 mm under grinding conditions of a rotational speed of 2,000 rpm and a feed rate of 500 mm/minute. Thus, conductive rubber rollers were produced.

Materials used in the present Examples and Comparative Examples were as follows:
Acrylonitrile-butadiene rubber (trade name: DN401LL; available from Nippon Zeon Co., Ltd.).
Epichlorohydrin rubber (trade name: GECHRON 3106; available from Nippon Zeon Co., Ltd.).
Conductive carbon black (trade name: ASAHI #35; available from Asahi Carbon Co., Ltd.).
Sulfur (trade name: SULFAX PMC; available from Tsurumi Kagaku Kogyo K.K.).
Thiazole type accelerator: dibenzothiazyl disulfide (trade name: NOCCELER DM-P; available from Ohuchi-Shinko Chemical Industrial Co., Ltd.).
Thiuram type accelerator: tetrakis(2-ethylhexyl)thiuram disulfide, (trade name: NOCCELER TOT-N; molecular weight: 633.18; available from Ohuchi-Shinko Chemical Industrial Co., Ltd.).
Azodicarbonamide (trade name; CELLMIC M257; available from Sankyo Kasei Co., Ltd.).
Urea (trade name; CELLMIC M258; available from Sankyo Kasei Co., Ltd.).

The tubes were obtained by using the production process as shown above and according to the formulation and parts by mass as shown in Table 3-1, to form the conductive rollers.

Evaluation methods in the present invention are described next.

How to Measure Dielectric Loss Coefficient $\varepsilon_r \cdot \tan \delta$:

The dielectric loss coefficient $\varepsilon_r \cdot \tan \delta$ was measured by using ENA Series Network Analyzer E5071B (300 kHz-8.5 MHz), manufactured by Agilent Technologies, and by bringing an electrode into contact with a measuring sample and irradiating the rubber with microwaves. In addition, a measurement frequency was 2,450 MHz, and unvulcanized rubber was used in an environment of a normal temperature of 23° C. The results are shown in Table 3-1.

How to Measure Rubber Temperature in UHF Vulcanizing Furnace at the Time of Microwave Irradiation:

A fluorescent thermometer (a fluorescence type fiber thermometer FL-2000, manufactured by Anritsu Meter Co., Ltd.) was used, and a detector of the fluorescent thermometer was inserted into the interior of the unvulcanized rubber tube extruded from the extruder, and was transported to the interior of the UHF vulcanizing furnace together with the unvulcanized rubber tube, thus the temperature was measured. The results are shown in Table 3-1.

How to Measure Hardness and Hardness Difference:

Using a hardness meter (Asker-C type; load: 4.9 N), the hardness of the tube made into the conductive roller was measured at four spots (one spot for each 90 degrees in the peripheral direction at an arbitrary position). The average value was expressed as hardness, and the difference between the maximum value and the minimum value of the hardness was expressed as hardness difference. It is preferable that the hardness difference is 0 or close to 0, or the closer to 0 the better. The results are shown in Table 3-1.

How to Ascertain Non-Uniformity of Foaming:

The rubber tube was cut at arbitrary positions, and the sections were observed with a video microscope (Digital Microscope VH-8000, trade name, manufactured by Keyence Corporation) to examine whether non-uniformity of foaming occurred. It is preferable that no non-uniformity of foaming is seen over the whole observation areas, in particular, that there is no difference between the cell diameter on the outer diameter side and the cell diameter on the inner diameter side. A case in which there is no difference is evaluated as "A"; a case in which there is a little difference, as "B"; and a case in which there is a difference, as "C". The results are shown in Table 3-1.

TABLE 3-1

|  | Example | | | Comparative Ex. | | |
| --- | --- | --- | --- | --- | --- | --- |
|  | 3-1 | 3-2 | 3-3 | 3-1 | 3-2 | 3-3 |
| Acrylonitrile-butadiene rubber: | 80 | 80 | 80 | 80 | 80 | 80 |
| Epichlorohydrin rubber: | 20 | 20 | 20 | 20 | 20 | 20 |
| Carbon black: | 10 | 20 | 30 | 50 | 90 | 0 |
| Sulfur: | 2 | 2 | 2 | 2 | 2 | 2 |
| Thiazole type accelerator: | 2 | 2 | 2 | 2 | 2 | 2 |
| Thiuram type accelerator: | 2.5 | 2.5 | 2.5 | 2.5 | 2.5 | 2.5 |
| Azodicarbonamide: | 4 | 4 | 4 | 4 | 4 | 4 |
| Urea: | 2 | 2 | 2 | 2 | 2 | 2 |
| Dielectric constant $\varepsilon_r$: | 3.64 | 4.77 | 5.89 | 8.15 | 12.66 | 2.45 |
| Dielectric power factor $\tan \delta$: | 0.09 | 0.09 | 0.08 | 0.07 | 0.05 | 0.09 |
| Dielectric loss coefficient $\varepsilon_r \cdot \tan \delta$: | 0.33 | 0.41 | 0.47 | 0.57 | 0.64 | 0.21 |
| Rubber temp. in UHF vulcanizing furnace: | 195 | 210 | 223 | 240 | — | 160 |
| Hardness (Asker C): | 25 | 30 | 35 | 40 | — | 35 |
| Hardness difference: | 1 | 1 | 1 | 4 | — | 2 |
| Foaming nonuniformity: | A | A | A | C | — | C |

Regarding Examples 3-1 to 3-3

As shown in Table 3-1, dielectric loss coefficients are within the proper range, so that the foaming non-uniformity and the hardness difference are small.

Regarding Comparative Examples 3-1 to 3-3

Cases deviating from what is required in the present invention are given as Comparative Examples. In all the cases, the dielectric loss coefficient deviates from that in the present invention. In Comparative Example 3-1, in which the carbon black is in a large quantity, the non-uniformity of foaming and the hardness difference are large, and in Comparative Example 3-2, the rubber was seen to be heated in excess. On the other hand, in Comparative Example 3-3, in which no carbon black is added, the rubber temperature does not sufficiently reach the decomposition temperature of the blowing agent under irradiation with microwaves, so that the foaming is effected in the HAV vulcanizing furnace to create non-uniformity of foaming in the peripheral direction.

EXAMPLES 4-1 to 4-7 & COMPARATIVE EXAMPLES 4-1 to 4-5

Immediately after discharged out of the take-off gear subsequently to vulcanization and foaming, tubes were each cut in a desired size by means of the gauge cutter to produce tubular conductive rubber forms. Subsequently, conductive core materials of from 4 to 10 mm in diameter coated with a hot-melt adhesive or a vulcanizing adhesive at their desired regions, were press-fitted into the inner-diameter part of the tubular conductive rubber forms to produce roller-shaped forms. These forms were each set on a grinder (not shown) fitted with a grindstone GC80, and were each so ground as to have an outer diameter of from 16 to 20 mm under grinding conditions of a rotational speed of 2,000 rpm and a feed rate of 500 mm/minute. Thus, conductive rubber rollers were produced.

Evaluation methods in the present invention are described below.

Outer Diameter of Tube Having been Vulcanized:

The outer diameter of the rubber tube having been vulcanized was measured at arbitrary positions with a digital vernier caliper (manufactured by Anritsu Meter Co., Ltd.) after vulcanization. Thereafter, the rubber tube was ground to have the desired outer diameter, and the grinding level (mm) was found by subtracting the outer diameter of the rubber tube having been ground from the outer diameter of the rubber tube having been vulcanized.

Mesh Belt Marks:

After the vulcanization, the rubber tube was cut at arbitrary positions, and marks of the mesh belt were ascertained by visual observation of the cut surface and the contact surface. A case in which the marks of the mesh belt were 1 mm or less in size in the diameter direction was evaluated as "no mesh belt mark"; and a case in which the marks of the mesh belt were more than 1 mm in size, as "mesh belt marks are present".

How to Ascertain Non-Uniformity of Foaming:

The rubber tube was cut at arbitrary positions, and the sections were observed with a video microscope (Digital Microscope VH-8000, trade name, manufactured by Keyence Corporation).

How to Measure Non-Uniformity of Hardness:

Using a hardness meter (Asker-C type; load: 4.9 N), the hardness of the tube made into the conductive roller was measured at four spots (one spot for each 90 degrees in the peripheral direction at an arbitrary position). The difference between the maximum value and the minimum value of the hardness was expressed as hardness difference. It is preferable that the hardness difference is 0 or close to 0, or the closer to 0 the better.

How to Measure Non-Uniformity of Electrical Resistance:

To measure roller electrical resistance, after being left standing for 48 hours in an environment of N/N (23° C./55% RH), the conductive rubber roller was brought into pressure contact with a drum 30 mm in outer diameter made of aluminum under application of a load of 4.9 N to each of both end portions of the conductive core material (mandrel or shaft) of the roller. In the state this was rotated, a voltage of 2 kV was applied between the shaft and the aluminum drum. The ratio of the maximum to the minimum of the resistance value thus measured was expressed as peripheral non-uniformity.

It is preferable that the peripheral non-uniformity is of the power of less than 1.2.

Formulation and parts by mass of rubber materials used in the present Examples and Comparative Examples are as follows: (by mass)

Acrylonitrile-butadiene rubber (trade name: DN401LL; available from Nippon Zeon Co., Ltd.) 84 parts Epichlorohydrin rubber (trade name: GECHRON 3106; available from Nippon Zeon Co., Ltd.) 16 parts Conductive carbon black (trade name: ASAHI #35; available from Asahi Carbon Co., Ltd.) 10 parts Zinc oxide (trade name: Zinc White JIS 2; available from Hakusui Tech Co., Ltd.) 5 parts Stearic acid (trade name: LUNAC S; available from Kao Corporation) 1 part Thiazole type accelerator: dibenzothiazyl disulfide (trade name: NOCCELER DM-P; available from Ohuchi-Shinko Chemical Industrial Co., Ltd.) 2 parts Thiuram disulfide type accelerator: tetrakis(2-ethylhexyl)thiuram disulfide (trade name: NOCCELER TOT-N; molecular weight: 633.18; available from Ohuchi-Shinko Chemical Industrial Co., Ltd.) 2.5 parts Sulfur (trade name: SULFAX PMC; available from Tsurumi Kagaku Kogyo K.K.) 2 parts Azodicarbonamide (trade name; CELLMIC M257; available from Sankyo Kasei Co., Ltd.) 4 parts Urea (trade name; CELLMIC M258; available from Sankyo Kasei Co., Ltd.) 2 parts In respect of the rubber layers constituted of acrylonitrile-butadiene rubber and epichlorohydrin rubber as rubber materials, provided in the present invention, some examples are given concerning the conditions specified in the present invention. The results are shown in Table 4-1.

It is seen from Table 4-1 that no mesh belt mark is seen, the foaming is uniform and free from non-uniformity, and as a result, the hardness difference is small and also the non-uniformity of electrical resistance is of the power of 1.1 or less. Also, the grinding level is 2 mm or less, and this is also economically effective.

Cases deviating from the conditions specified in the present invention are given as Comparative Examples. The results are shown in Table 4-2. In all the cases, the mesh belt marks are seen, and as a result, the non-uniformity of foaming, the hardness difference and the electrical resistance non-uniformity in the peripheral direction are large. Because of the non-uniformity of foaming, the grinding level also is increased.

TABLE 4-1

| | Example | | | | | | |
|---|---|---|---|---|---|---|---|
| | 4-1 | 4-2 | 4-3 | 4-4 | 4-5 | 4-6 | 4-7 |
| Tube outer diameter (A): (mm) | 16 | 16 | 16 | 20 | 20 | 20 | 20 |
| Mesh opening percentage (B): (%) | 56 | 64 | 69 | 56 | 64 | 69 | 79 |
| Ratio A/B: | 0.29 | 0.25 | 0.23 | 0.36 | 0.31 | 0.29 | 0.25 |
| Mesh belt marks: | none | none | none | none | none | none | none |
| Grinding level: (mm) | 1.3 | 1.2 | 1.5 | 1.3 | 1.2 | 1.5 | 1.6 |
| Foaming nonuniformity: | none | none | none | none | none | none | none |
| Hardness difference (Asker C): | 1 | 0.8 | 1.2 | 1.3 | 0.8 | 1 | 1 |
| Electrical resistance nonuniformity in peripheral direction: | 1.02 | 1.03 | 1.05 | 1.04 | 1.03 | 1.08 | 1.08 |

TABLE 4-2

| | Comparative Example | | | | |
|---|---|---|---|---|---|
| | 4-1 | 4-2 | 4-3 | 4-4 | 4-5 |
| Tube outer diameter (A): (mm) | 16 | 16 | 16 | 16 | 16 |
| Mesh opening percentage (B): (%) | 11 | 25 | 83 | 85 | 91 |
| Ratio A/B: | 1.45 | 0.64 | 0.19 | 0.19 | 0.18 |
| Mesh belt marks: | yes | yes | yes | yes | yes |
| Grinding level: (mm) | 3 | 2.5 | 2.2 | 2.5 | 3 |
| Foaming nonuniformity: | yes | yes | yes* | yes | yes |
| Hardness difference (Asker C): | 6 | 4 | 3 | 5 | 7 |
| Electrical resistance nonuniformity in peripheral direction: | 1.2 | 1.3 | 1.1 | 1.4 | 1.3 |

*a little

EXAMPLES 5-1 to 5-5 & COMPARATIVE EXAMPLES 5-1 to 5-5

Conductive rubber rollers (FIG. 1) which demonstrate the present invention were produced in the following way.

75 parts by mass of acrylonitrile-butadiene rubber (DN401, trade name, available from Nippon Zeon Co., Ltd.), 10 parts by mass of epichlorohydrin rubber (GECHRON 3106, trade name, available from Nippon Zeon Co., Ltd.), 15 parts by mass of ethylene oxide-propylene oxide-allyl glycidyl ether terpolymer (compositional proportion of propylene oxide: 1.30 mol %; compositional proportion of allyl glycidyl ether: 11.7 mol %; a trial product), 4 parts by mass of azodicarbonamide (VINYFOR AC, trade name, available from Eiwa Chemical Ind. Co., Ltd.), 1 part by mass of stearic acid (LUNAC S20, trade name, available from Kao Corporation), 5 parts by mass of zinc oxide (Zinc White JIS 1, trade name, available from Hakusui Chemical Industries, Ltd.) and 10 parts by mass of carbon (ASAHI 35, trade name, available from Asahi Carbon Co., Ltd.) were kneaded by means of a Banbury mixer, and the kneaded product obtained was shaped into a ribbon by using an open roll and a ribbon shaping and sheeting machine. This rubber composition shaped into a ribbon was introduced in the extruder 11 (manufactured by Micro Denshi Co., Ltd.) of the vulcanizing forming system shown in FIG. 3, and unvulcanized rubber composition tubes were extruded under various conditions.

The rubber composition tubes thus obtained were each heated by means of the UHF vulcanizing unit 12 (manufactured by Micro Denshi Co., Ltd.) in a microwave irradiation zone of 4 m and under conditions shown in Tables 5-1 and 5-2, to effect foaming and vulcanization. The foamed tube obtained was taken off by means of the take-off gear 14. Immediately after discharged out of the take-off gear 14, the tube was cooled in the cooling bath 15, and then cut in a desired size by means of the gauge cutter 16 to produce a foamed rubber tube of 16.0 mm in outer diameter, 4.2 mm in inner diameter and 250 mm in length. Thereafter, a conductive core material of 6 mm in outer diameter was press-fitted into the inner-diameter part of the foamed rubber tube by means of the automatic core material press-fit machine 17 to produce a roller-shaped form having the foamed rubber tube as a foamed rubber layer. This roller-shaped form was set on a grinder (not shown) fitted with a grindstone GC80, and was so ground as to have an outer diameter of 17 mm under grinding conditions of a rotational speed of 2,000 rpm and a feed rate of 0.5 m/minute. Thus, conductive rubber rollers were produced.

The measurement of aspect ratios of inner and outer diameters of each foamed rubber tube, the evaluation of cell diameter distribution of each foamed rubber tube, the measurement of hardness non-uniformity of each conductive rubber roller, the measurement of electrical resistance value and environmental variation level of each conductive rubber roller and the measurement of electrical resistance non-uniformity of each conductive rubber roller in the above Examples and Comparative Examples were made in the following way. The results obtained are shown in Tables 5-1 and 5-2.

How to Measure Aspect Ratios of Inner and Outer Diameters of Foamed Rubber Tube:

The foamed rubber tube was cut at arbitrary positions under arbitrary conditions, and the sections were projected by using a projector (Profile Projector V-12B, trade name, manufactured by Nikon Corporation), and the maximum ($t_{max}$) and minimum ($t_{min}$) of each of the inner diameter and outer diameter of each of the projected sections were measured and the ratio of $t_{max}/t_{min}$ was determined. It is preferable that this ratio is close to 1.

How to Measure Non-Uniformity of Hardness of Conductive Rubber Roller:

Using a hardness meter (Asker-C type; load: 4.9 N), the hardness of the foamed rubber layer of the conductive rubber roller was measured at four spots (one spot for each 90 degrees in the peripheral direction at an arbitrary position). The difference between the maximum value and minimum value of the hardness was determined and was regarded as hardness non-uniformity. It is preferable that the non-uniformity of hardness is close to 0.

How to Evaluate Cell Diameter Distribution of Foamed Rubber Tube:

The foamed rubber tube was cut at arbitrary positions, and the sections were recorded by using a video microscope (Digital Microscope VH-8000, trade name, manufactured by Keyence Corporation). The difference in measure between the cell diameter on the outer-diameter side and the cell diameter on the inner-diameter side was ascertained by measuring them with a gauge displayed on a monitor of the video microscope. It is preferable that there is no difference between the cell diameter on the outer-diameter side ($D_{ou}$) and the cell diameter on the inner-diameter side ($D_{in}$). Evaluation was made according to the following criteria.

A: There is no difference; $(|D_{ou}-D_{in}|/D_{ou}) \leq 1.5$ or $(|D_{ou}-D_{in}|/D_{in}) \leq 1.5$.
B: There is a little difference; $1.5 < (|D_{ou}-D_{in}|/D_{ou}) \leq 2.0$ or $1.5 < (|D_{ou}-D_{in}|/D_{in}) \leq 2.0$.
C: There is a difference; $(|D_{ou}-D_{in}|/D_{ou}) > 2.0$ or $(|D_{ou}-D_{in}|/D_{in}) > 2.0$.

How to Measure Electrical Resistance and Environmental Variation Level of Conductive Rubber Roller:

To measure the electrical resistance of the conductive rubber roller, the conductive rubber roller was brought into pressure contact with a drum 30 mm in outer diameter made of aluminum under application of a load of 4.9 N to each of both end portions of the shaft of the roller. In the state this was rotated, a voltage of 2 kV was applied between the shaft and the aluminum drum. Measurement was made after the conductive rubber roller was left standing for 48 hours in each environment of L/L (15° C./10% RH), N/N (23° C./55% RH) and H/H (35° C./85% RH). The difference between the maximum value $R_{LL}$ of resistance value in the L/L environment and the maximum value $R_{HH}$ of resistance value in the H/H environment measured was expressed by the difference in power $[\log(R_{LL}/R_{HH})]$. It is preferable that the environmental variation level of the electrical resistance is of the power of less than 1.2.

How to Measure Non-Uniformity of Electrical Resistance of Conductive Rubber Roller:

After being left standing for 48 hours in an environment of 23° C./55% RH, the conductive rubber roller was brought into pressure contact with a drum 30 mm in outer diameter made of aluminum under application of a load of 4.9 N to each of both end portions of the shaft of the roller. In the state this was rotated, a voltage of 2 kV was applied between the conductive core material of the conductive rubber roller and the drum made of aluminum to measure the electrical resistance. The difference in resistance value between the maximum value $R_{max}$ and minimum value $R_{min}$, $R_{max}-R_{min}$, measured was expressed by the difference in power $[\log(R_{max}/R_{min})]$. It is preferable that the non-uniformity of electrical resistance is of the power of less than 1.2.

As shown in Table 5-1, in Examples 5-1 to 5-5, the rubber composition from which the foamed rubber layer is formed is any one of i) a rubber composition containing 0.1 part by mass of an ethylene oxide-propylene oxide-allyl glycidyl ether terpolymer having the propylene oxide in a compositional proportion of 1.30 mol % and the allyl glycidyl ether in a compositional proportion of 11.7 mol %, 75 parts by mass of acrylonitrile-butadiene rubber and 24.9 parts by mass of epichlorohydrin rubber and ii) a rubber composition containing 50 parts by mass of an ethylene oxide-propylene oxide-allyl glycidyl ether terpolymer having the propylene oxide in a compositional proportion of 1.30 mol % and the allyl glycidyl ether in a compositional proportion of 11.7 mol %, 50 parts by mass of acrylonitrile-butadiene rubber and 0 part by mass of epichlorohydrin rubber, and is irradiated with microwaves by using two or four microwave oscillators each having an output of from 0.1 to 1.5 kW, while being transported at a speed of from 0.5 to 3.0 m/min through the interior of a microwave vulcanizing furnace having a microwave irradiation zone of 4 m or less. It is seen that the aspect ratios of the inner and outer diameters of each foamed conductive rubber form are as small as 1.06 or less and the cell diameter distribution is uniform. It is further seen that the non-uniformity of hardness of each conductive rubber roller in the peripheral direction is small and the desired resistance value is achieved, and that the non-uniformity of electrical resistance is small and the environmental variation level is of the power as small as 1.2 or less.

On the other hand, as shown in Table 5-2, in Comparative Examples 5-1 to 5-5, the rubber composition from which the foamed rubber layer is formed is any one of i) a rubber composition containing 0 part by mass of an ethylene oxide-propylene oxide-allyl glycidyl ether terpolymer having the propylene oxide in a compositional proportion of 1.30 mol % and the allyl glycidyl ether in a compositional proportion of 11.7 mol %, 70 parts by mass of acrylonitrile-butadiene rubber and 30 parts by mass of epichlorohydrin rubber and ii) a rubber composition containing 60 parts by mass of an ethylene oxide-propylene oxide-allyl glycidyl ether terpolymer having the propylene oxide in a compositional proportion of 1.30 mol % and the allyl glycidyl ether in a compositional proportion of 11.7 mol %, 40 parts by mass of acrylonitrile-butadiene rubber and 0 parts by mass of epichlorohydrin rubber, and is irradiated with microwaves by using one or six, or two or four, microwave oscillator(s) each having an output of from 0.1 to 1.5 kW, while being transported at a speed of from 0.3 m/min or 3.5 m/min through the interior of a microwave vulcanizing furnace having a microwave irradiation zone of 4 m or less. It is seen that in Comparative Example 5-4, the rubber tube is not vulcanized and foamed and is unable to be formed as the conductive rubber roller. It is further seen that in Comparative Examples 5-1, 5-2, 5-3 and 5-5, the non-uniformity of hardness, the non-uniformity of electrical resistance and the environmental variation level are large, and that the cell diameter distribution is poor and the aspect ratios of the inner and outer diameters of each foamed conductive rubber form are larger than those in Examples.

TABLE 5-1

|  | Example | | | | |
| --- | --- | --- | --- | --- | --- |
|  | 5-1 | 5-2 | 5-3 | 5-4 | 5-5 |
| EO-PO-AGE terpolymer: | 0.1 | 50 | 0.1 | 50 | 0.1 |
| Acrylonitrile-butadiene rubber: | 75 | 50 | 75 | 50 | 75 |
| Epichlorohydrin rubber: | 24.9 | 0 | 24.9 | 0 | 24.9 |
| Microwave oscillator n: (number) | 2 | 2 | 2 | 2 | 4 |
| Microwave output [1 kw × n]: (kw) | 2 | 2 | 2 | 2 | 4 |

TABLE 5-1-continued

|  | Example | | | | |
| --- | --- | --- | --- | --- | --- |
|  | 5-1 | 5-2 | 5-3 | 5-4 | 5-5 |
| Transport speed: (m/min) | 0.5 | 0.5 | 2.0 | 3.0 | 3.0 |
| Tube aspect ratio (outer diameter): | 1.02 | 1.06 | 1.02 | 1.04 | 1.01 |
| Tube aspect ratio (inner diameter): | 1.01 | 1.05 | 1.03 | 1.03 | 1.02 |
| Hardness nonuniformity: | 1 | 1 | 1 | 1 | 0 |
| Resistance value: ($\Omega$) | 7.30E+07 | 1.46E+05 | 7.56E+07 | 1.35E+05 | 7.67E+07 |
| Electrical resistance environmental variation level: (power) | 0.98 | 1.12 | 0.97 | 1.11 | 0.95 |
| Electrical resistance nonuniformity: (power) | 1.02 | 1.04 | 1.02 | 1.06 | 1.01 |
| Cell diameter distribution: | A | A | A | A | A |

TABLE 5-2

|  | Comparative Example | | | | |
| --- | --- | --- | --- | --- | --- |
|  | 5-1 | 5-2 | 5-3 | 5-4 | 5-5 |
| EO-PO-AGE terpolymer: | 0 | 60 | 60 | 0 | 0 |
| Acrylonitrile-butadiene rubber: | 70 | 40 | 40 | 70 | 70 |
| Epichlorohydrin rubber: | 30 | 0 | 0 | 30 | 30 |
| Microwave oscillator n: (number) | 2 | 2 | 4 | 1 | 6 |
| microwave output [1 kw × n]: (kw) | 2 | 2 | 4 | 1 | 6 |
| Transport speed: (m/min) | 0.3 | 3.5 | 3.5 | 0.3 | 0.3 |
| Tube aspect ratio (outer diameter): | 2.35 | 1.31 | 1.56 | NM | 1.91 |
| Tube aspect ratio (inner diameter): | 2.98 | 1.21 | 1.66 | NM | 2.23 |
| Hardness nonuniformity: | 7 | 4 | 5 | NM | 7 |
| Resistance value: ($\Omega$) | 1.21E+07 | 5.10E+06 | 8.20E+05 | NM | 9.16E+08 |
| Electrical resistance environmental variation level: (power) | 1.87 | 1.14 | 1.21 | NM | 1.95 |
| Electrical resistance nonuniformity: (power) | 1.38 | 1.78 | 2.11 | NM | 2.03 |
| Cell diameter distribution: | C | B | B | NM | C |

NM: not measurable

The conductive rubber roller obtained by the production process of the present invention and the roller for electrophotographic apparatus of the present invention are preferably usable as transfer rollers and so forth in image forming apparatus such as electrophotographic copying apparatus, printers and electrostatic recording apparatus.

This application claims priorities from Japanese Patent Applications No. 2005-036079 filed Feb. 14, 2005, No. 2005-036080 filed Feb. 14, 2005, No. 2005-047222 filed Feb. 23, 2005, No. 2005-049003 filed Feb. 24, 2005, No. 2005-053816 filed Feb. 28, 2005, and No. 2006-027022 filed Feb. 3, 2006, which are hereby incorporated by reference herein.

What is claimed is:

1. A process for producing a conductive rubber roller having a conductive core material and a rubber layer provided thereon, wherein
the rubber layer contains at least acrylonitrile rubber, epichlorohydrin rubber and a blowing agent,
the rubber layer has a gas generation rate of from 2 ml/g·min to 4 ml/g·min at 170° C. to 230° C., and
the process has a vulcanizing and foaming step of vulcanizing and foaming the rubber layer by using a microwave vulcanizing furnace which provides hot air and irradiation with microwaves, where a temperature of a heating atmosphere in the microwave vulcanizing furnace in the vulcanizing and foaming step is so controlled that a ratio of initial vulcanizing time T10 to initial foaming time Tp10, T10/Tp10, of the rubber layer is from 1 or more to less than 3 and the T10 is within 90 seconds.

2. The process for producing a conductive rubber roller according to claim 1, wherein the rubber layer contains a thiuram type accelerator and a thiazole type accelerator, and the thiuram type accelerator has a molecular weight of from 200 or more to 650 or less.

* * * * *